(12) United States Patent
Huang

(10) Patent No.: US 7,181,456 B2
(45) Date of Patent: Feb. 20, 2007

(54) PROCESS DESCRIPTION LANGUAGE

(75) Inventor: Jong Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/225,397

(22) Filed: Aug. 20, 2002

(65) Prior Publication Data

US 2004/0039732 A1 Feb. 26, 2004

(51) Int. Cl.
*G06F 17/30* (2006.01)
(52) U.S. Cl. .................. 707/10; 707/104.1; 709/203
(58) Field of Classification Search .............. 707/10, 707/101, 102, 104.1; 715/505.1, 501.1; 709/203, 709/219
See application file for complete search history.

(56) References Cited

U.S. PATENT DOCUMENTS 6,083,276 A * 7/2000 Davidson et al. ........... 717/107
6,622,144 B1 * 9/2003 Rush, Jr. .................... 707/101
6,643,650 B1 * 11/2003 Slaughter et al. ............. 707/10
6,662,199 B1 * 12/2003 Flight et al. ............. 707/104.1
6,684,216 B1 * 1/2004 Duliba et al. ............... 707/102
6,732,331 B1 * 5/2004 Alexander .................. 715/513
2001/0037345 A1 11/2001 Kiernan et al.
2003/0195923 A1 * 10/2003 Bloch et al. ................ 709/203

OTHER PUBLICATIONS

Shanmugasundaram, J., et al., "Effeciently Publishing Relational Data as XML Documents," *Proceedings of the 26th International Conference on Very Large Databases*, Cairo, Egypt, 2000, pp. 65-76.

* cited by examiner

*Primary Examiner*—Leslie Wong
(74) *Attorney, Agent, or Firm*—Microsoft Corporation

(57) ABSTRACT

A description file that includes multiple statements written in a customizable, tag-based interpreted language for processing data contained in the messages is disclosed. A data shaper translates and then executes each statement in the description file. The customizable, tag-based interpreted language, defines the operational behavior of the data shaper. The operational behavior shapes data contained in the messages to produce publishable matter suitable for online presentation.

12 Claims, 28 Drawing Sheets

301 — SUNNY  Friday, July 23, 2002
Seattle weather: 90°F (30°C)

313

KWAN NEAR GOLD — 316

302 — • U.S.'s Kwan, Cohen, Hughes duel Russia's Slutskaya — 304 / 311

318 — REPLAY DAY 7: Ice Hockey: U.S. vs. Russia, a rematch

306 — SPOTLIGHTS

308A Biathlon — Finland's Lundberg burdened by golds
308B Short Track — Slide Show: Ohno, Kim in heroic struggle
308C Ice Hockey — Slide Show: Canada performs two miracles
308D Visions — Triumph of an athlete is felt by the whole nation
308E Moment — More than gold is won for disabled Yandal
308F Style — Look your best while watching the games 312 — GET THE LATEST XBC Official Online Content Provider

Live Now — 313A
- Alpine Skiing
- Curling
- Speed Skating
- Today's complete schedule

On Air — 311A

TODAY ON XBC:
- Nordic Combined: Denmark's Schwegman thrists for his sixth gold in the K240 sprint
- Speed Skating: Fried-McDonald gets gold
- Women's Hockey: Canada can't find the puck, but U.S. did and won!

Medal Standings — 314A

| NATION | G | S | B | TOT |
|---|---|---|---|---|
| 🏴 | 9 | 15 | 7 | 31 |
| ● | 9 | 9 | 8 | 26 |
| ★ | 10 | 6 | 2 | 18 |
| 🏴 | 1 | 4 | 9 | 14 |
| 🏴 | 5 | 5 | 3 | 13 |

314B 314C 314D 314E 314F

314

310 — Belltown Outdoor Cinema
*Sit Watch Smooch*

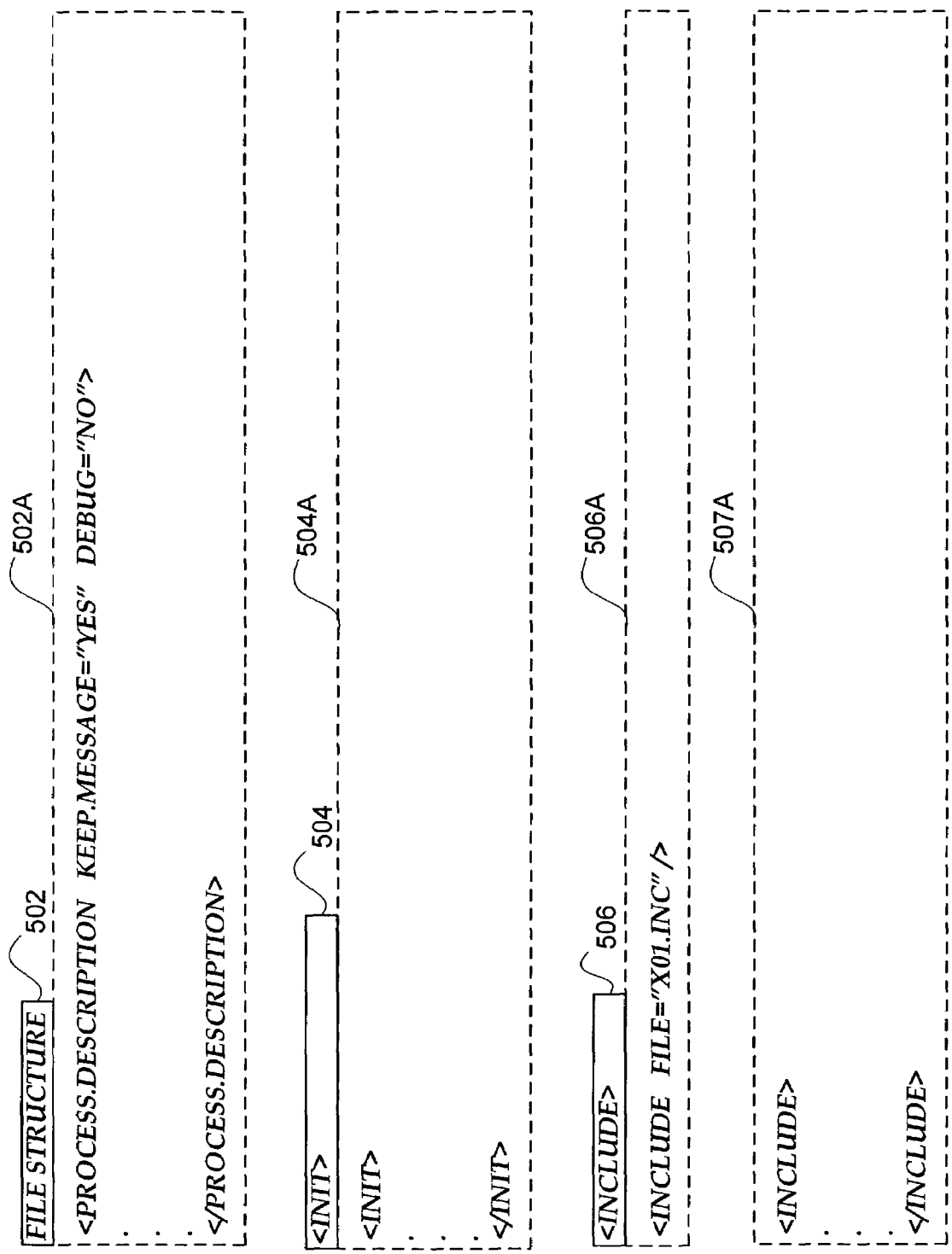

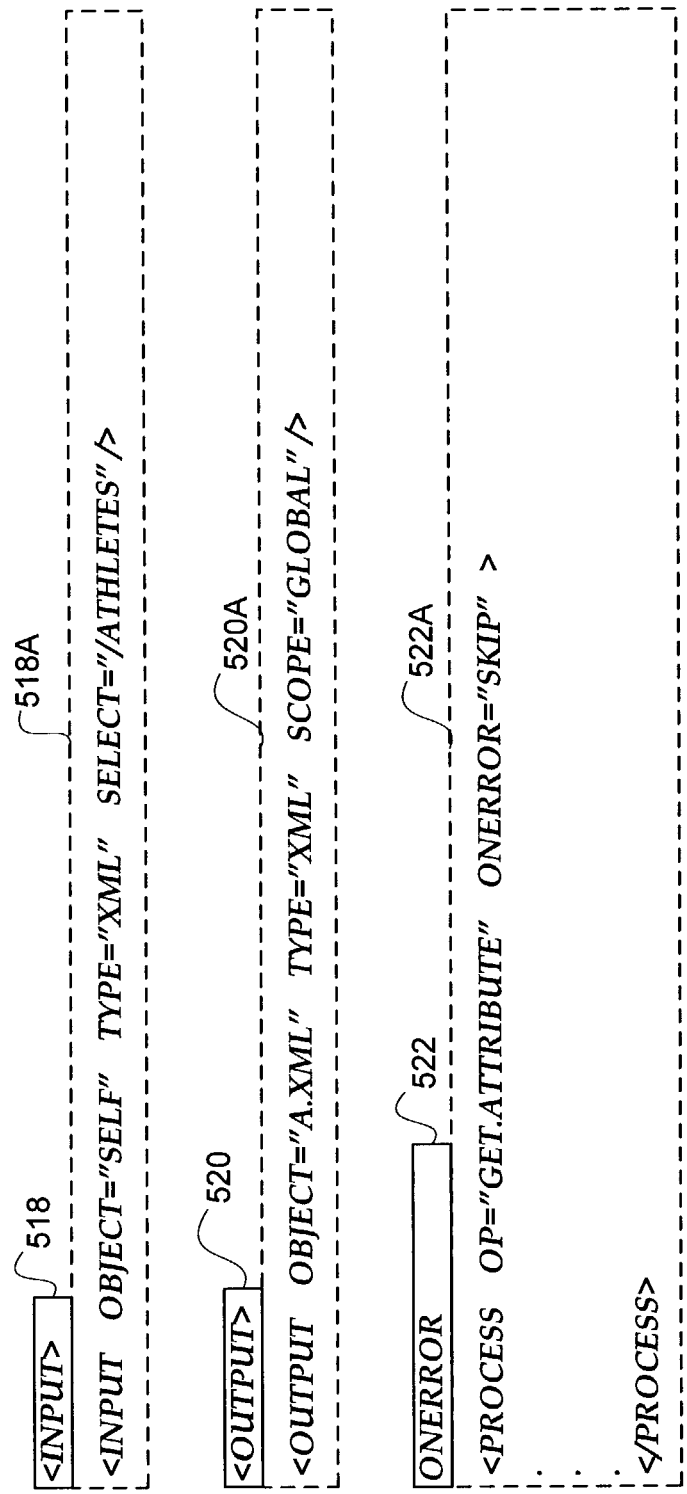

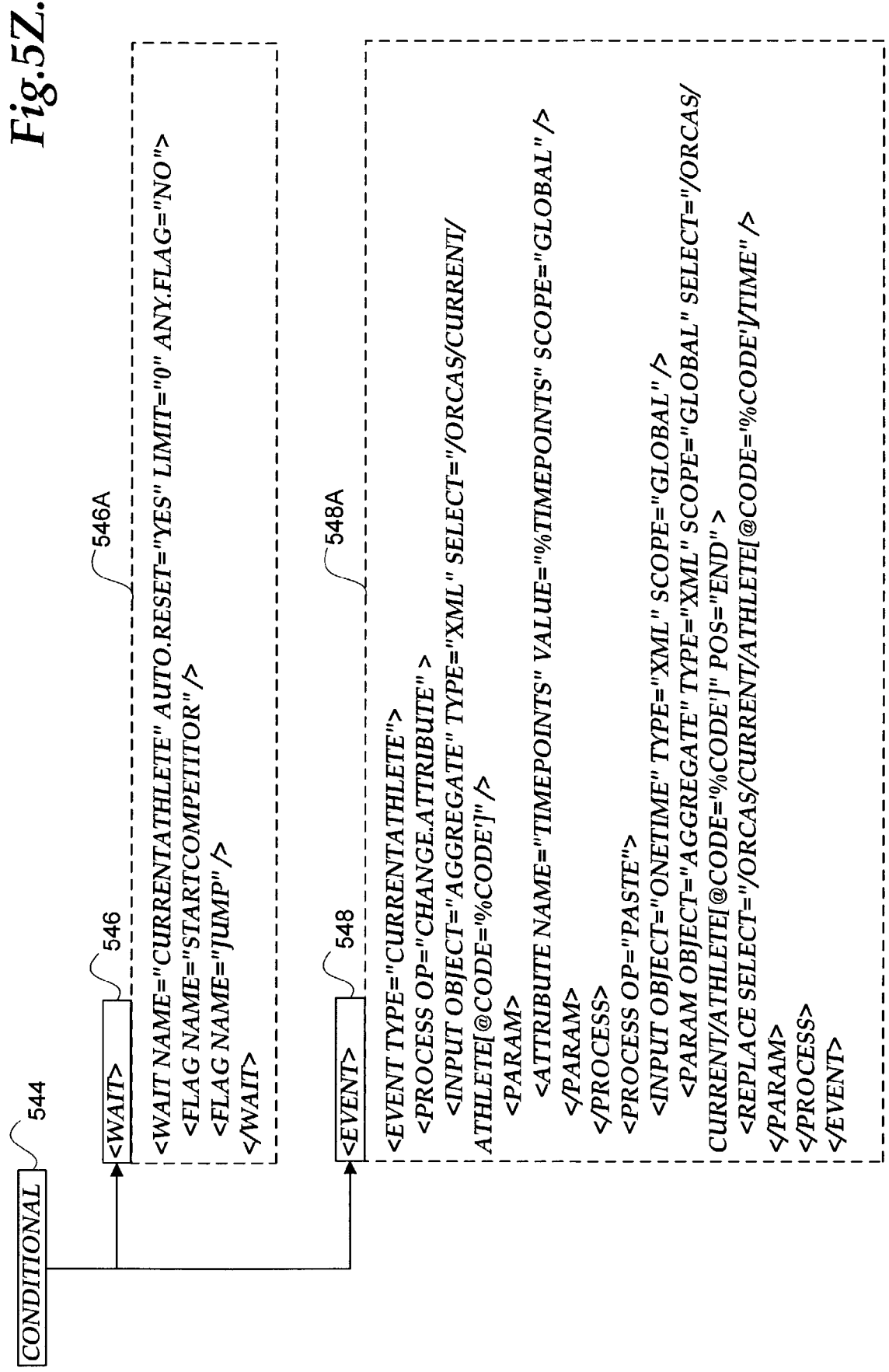

Fig.6A.

```
<?XML VERSION="1.0" ENCODING="UTF-8"?>
<PROCESS.DESCRIPTION KEEP.MESSAGE="YES" DEBUG="NO">
  <INIT>
    <INCLUDE FILE="INIT.INC"/>

</INIT>
    <INCLUDE FILE="X01.INC"/>
    <INCLUDE FILE="X05.INC"/>
    <INCLUDE FILE="73A.INC"/>
    <MESSAGE TYPE="73B" SAME.AS="73A" />
</PROCESS.DESCRIPTION>
```

Fig.6B.

```
<INCLUDE>
  <PROCESS OP="CONNECT">
    <INPUT OBJECT="NEW" TYPE="DB" />
    <PARAM NAME="A" SERVER="B" LOGIN="*" PASSWORD="*" TIMEOUT="60" />
    <OUTPUT OBJECT="OLYMPICS" TYPE="DB" SCOPE="GLOBAL"/>
  </PROCESS>
  <PROCESS OP="SET.VARIABLE">
    <INPUT OBJECT="NEW" TYPE="STRING" />
    <PARAM VALUE="E:" OBJECT="FILESYS" SCOPE="GLOBAL" />
  </PROCESS>
</INCLUDE>
```

*Fig.6C.*

```
┌─ 638
│ <INCLUDE>  ─ 640
│   <MESSAGE TYPE="73A" FLAG="RESULTS" >
│
│     <PROCESS OP="EXEC.SP">  ─ 642
│       <INPUT OBJECT="OLYMPICS" TYPE="DB" SCOPE="GLOBAL"/>
│       <PARAM>
│         <SP NAME="RESULTSTORE" >
│           <ARG OBJECT="SELF" TYPE="XML" SCOPE="GLOBAL"
│ ARGTYPE="NTEXT"/>
│         </SP>
│       </PARAM>
│     </PROCESS>  ─ 644
│
│     <PROCESS OP="GET.ATTRIBUTE" >  ─ 646
│       <INPUT OBJECT="SELF" TYPE="XML" SELECT="/SLC_2002_SPORTS"/>
│       <PARAM>
│         <ATTRIBUTE NAME="RSC" OBJECT="RSCR" SCOPE="GLOBAL"/>
│         <ATTRIBUTE NAME="D" OBJECT="D" SCOPE="MESSAGE"/>
│       </PARAM>
│     </PROCESS>  ─ 648
│
│     <PROCESS OP="EXEC.SP">  ─ 650
│       <INPUT OBJECT="OLYMPICS" TYPE="DB" SCOPE="GLOBAL"/>
│       <PARAM>
│         <SP NAME="RESULTLIST" >
│           <ARG OBJECT="STRING" VALUE="%RSCR" SCOPE="GLOBAL"/>
│           <ARG OBJECT="STRING" VALUE="0" ARGTYPE="TINYINT"/>
│         </SP>
│       </PARAM>
│       <OUTPUT OBJECT="SRESULTS" TYPE="XML" SCOPE="MESSAGE"/>
│     </PROCESS>  ─ 652
│
│     <PROCESS OP="SAVE">  ─ 654
│       <INPUT OBJECT="SRESULTS" TYPE="XML" SCOPE="MESSAGE"/>
│       <PARAM PATH="%FILESYS\ORCAS_S\R\2\RES\RES_%RSCR.XML"/>
│     </PROCESS>  ─ 656
│
│     <PROCESS OP="SEND.MESSAGE" >  ─ 658
│       <PARAM DEST="%FILESYS\ORCAS_Q\PUB\PUB300\IN\%DT.350">
│ <![CDATA[<MESSAGE TYPE="350" DISCIPLINE="%D" RSC="%RSCR"
│ NAME="BUILD.RESULTS.SIMPLE">B\_%RSCR.XML</MESSAGE>]]>
│       </PARAM>
│     </PROCESS>  ─ 660
│   </MESSAGE>  ─ 662
│ </INCLUDE>  ─ 664
└─────────────────────────────────────────────────────────
```

PROCESS DESCRIPTION LANGUAGE

FIELD OF THE INVENTION

The present invention relates generally to an artificial language, and more particularly, to a process description language that can be used to define a sequence of instructions that can ultimately be processed and executed by a computer for processing messages for online presentation.

BACKGROUND OF THE INVENTION

Hypertext markup language ("HTML" in the idiom of computer science) has been a text-formatting language in use since 1989 for documents on the interconnected computing network known as the World Wide Web. HTML documents are text files that contain two parts: content that is meant to be rendered on a computer screen; and pre-defined markup, or tags, which are encoded information that directs the formatting of text on the screen and is generally hidden from a user.

The predefined tags are specifically defined by HTML. While useful, predefined tags cannot be altered by a developer of HTML documents. Some HTML document tags determine the way certain text, such as titles, are formatted. Other tags cue a computer to respond to a user's actions on a keyboard or mouse. For instance, when a user clicks on an icon, another piece of software for displaying a graphic, playing a recording, or running a short movie may be called. Another important tag is a link, which may contain the uniform resource locator (URL) of another HTML document. A URL can be compared to an address where a particular HTML document resides. While it is possible for a called HTML document to be stored on the same computer as a calling HTML document, more typically the called HTML document is stored on another computer connected to the calling computer via the World Wide Web. A user can navigate from document to document simply by clicking on HTML document links. HTML tags also include form tags that let a user fill out information and electronically send, or e-mail, the data to the forms' author, initiate sophisticated searches of information on the Internet, or order goods and services.

The software that permits a user to navigate the World Wide Web and view HTML-encoded documents is called a browser. HTML predefined tags indicate to a browser how the browser should display information to a user and how the browser should respond to a user's actions, such as activating a link by means of a key press or mouse click. HTML version 2.0 was the first version of HTML widely used on the World Wide Web. Later versions of HTML have improved upon the first version of HTML, namely: HTML+; HTML version 3.0, which introduced tables; HTML version 3.2, which included the recognition of applets and the ability to flow text around images; and HTML version 4.0, which supported style sheets and scripting languages. Additionally, Web developers and designers have grown beyond what is offered by the variants of HTML. Web developers and designers require greater flexibility in organizing and presenting information than is possible with the older HTML document coding system; hence, the emergent of extensible markup language (XML).

Unlike HTML, in which the meaning of all tags is pre-determined, XML allows developers to define their own tags. For example, a publisher and a bookstore might choose to define their own tags for information about authors, titles, and publication dates for the information they exchange. Similarly, an auto maker and a dealership might choose to define their own unique tags for models, body styles, and prices.

Because of its flexibility in organizing and presenting information, XML has been employed for data-intensive operations. A case in point is the use of XML in the communication of performance information generated in connection with athletic events, which include sports or games engaged in by athletes involving physical strength, skill, endurance, and speed. For data-intensive operations, a special set of problems exist in regard to processing. For example, new information captured during the course of events often causes abrupt changes to the organizational schemes of messages containing data, such as performance information. Prior conventional systems cannot be quickly customized so as to easily adapt to changes in the structure of messages. This problem as well as other problems are described below with reference to a conventional system 100 shown in FIG. 1.

The system 100 includes a client 102, which is a computer that accesses shared network resources, such as a relational database 118, being provided by another computer, such as a server 108, via a local area network or the Internet 106. A browser 104 executed on the client 102 lets a user view HTML or XML documents and access files and software related to those documents. To access the processing power of the relational database 118, which is a file composed of records (each containing fields together with a set of operations for searching, sorting, recombining, and other processing functions), the client 102 sends one or more XML queries formed from the XML-QL language. The XML-QL language is a type of data manipulation language used for processing, retrieving, and displaying data from a database. Like HTML, the XML-QL language allows no deviation from the prescribed format to access the relational database 118.

Once issued by the client 102, XML-QL queries are intercepted by a Web daemon 110. The Web daemon 110 is a program associated with the UNIX operating system running on the server 108 and used for intercepting XML-QL queries received from the client 102 (or other clients, not shown), communicating XML-QL queries to a parser 112, and transmitting relational data as XML back to the client 102. The parser 112 converts an XML-QL query to a language-neutral intermediate representation. The intermediate representation is a sequence of operations that describe how the markup output of the XML-QL query is derived from the underlying relational tables in the relational database 118. The relational database 118 is a file composed of records (each containing fields together with a set of operations for searching, sorting, recombining, and other processing functions), for processing data into multiple tables. The multiple tables, each of which has been specially designed by a programmer who is well versed in the database art, are data structure characterized by rows and columns, with data occupying or potentially occupying each cell formed by a row-column intersection. The relationship between a table in the relational database 118 to an XML-QL query being parsed by the parser 112 is mapped by a schema mapper 120. The schema mapper 120 establishes an XML schema for a view into the data stored in a table in the relational database 118. Each table in the relational database 118 is mapped to a virtual XML document in the schema mapper 120. When XML-QL queries are issued, they are issued toward one or more virtual XML documents.

An SQL writer 114 takes the intermediate representation generated by the parser 112 and translates it to an actual SQL query over one or more tables in the relational database 118. Now that the original XML-QL query has been translated into an SQL query, which is comprehensible by the relational database 118, the relational database 118 proceeds to process the SQL query to produce an SQL query result. A tagger 122 receives the SQL query result and generates markup output for producing publishing relational data from the tables of relational database 118. The publishing relational data is generated using XML. The Web daemon 110 picks up the XML publishing relational data from the tagger 122 and forwards it to the client 102 for displaying by the browser 104.

The main problem with the system 100 is that XML-QL queries forwarded by the client 102 must be formed in accordance with the prescription of the XML-QL language. While XML provides greater flexibility in describing and organizing information than HTML, the use of the XML-QL language by the system 100 eliminates these advantages of XML. New information captured during the course of events, such as sports events, often cause abrupt changes to the organizational schemes of messages. The system 100 can neither recognize nor tolerate these changes. Ultimately, these changes will either be rejected or be processed incorrectly by the system 100. Although the rejection or incorrect processing of a few messages may be tolerable, the rejection or incorrect processing of many of the hundreds, sometimes thousands, of messages generated by complex events, such as the Olympic games, or other types of events that are not necessarily sports events is not desirable. Further, the schema mapper 120 and the SQL writer 114, among other elements, add to the lackluster performance of the system 100, thereby making undesirable the use of the system 100 in situations where timely presentation is paramount to a user's viewing experience. Another problem of the system 100 is that it contemplates that the only shared resource in the system 100 is the relational database 118. But consider a situation where the shared resource is not a database. No provision is made for the system 100 to handle other shared resources. The system 100 provides no mechanisms for processing XML messages that are not queries, and therefore, are not directed to a relational database.

Thus, there is a need for better systems, methods, and computer-readable media for processing online content while avoiding and reducing the foregoing and other problems associated with existing processing schemes.

SUMMARY OF THE INVENTION

In accordance with this invention, a system, method, and computer-readable medium for processing messages for online presentation is provided. The system form of the invention comprises a computer-readable means having a description file stored thereon. The description file includes multiple statements written in a customizable, tag-based interpreted language for processing data contained in the messages. The system also includes a data shaper for translating and executing the statements in the description file. The description file defines the operational behavior of the data shaper such that data contained in the messages is shaped into publishable matter suitable for online presentation.

In accordance with further aspects of this invention, the method form of the invention is implementable in a computer system. The method comprises reading a description file that includes multiple statements written in a customizable, tag-based interpreted language used to process data contained in the messages. The method further includes translating and then executing each statement of the multiple statements written in the customizable, tag-based interpreted language. The description file defines the operational behavior of a data shaper such that data contained in the messages is shaped into publishable matter suitable for online presentation.

In accordance with further aspects of this invention, the computer-readable medium form of the invention stores a customizable, tag-based data structure suitably for use by a data shaper to shape data contained in messages into publishable matter suitable for online presentation. More particularly, the data structure comprises an initialization tag that is indicative of one or more processes that are to be immediately executed after the data shaper has read the customizable, tag-based data structure. The data structure further comprises one or more message tags, each of which identifies a message handler suitable for processing a specific type of message.

Because the processing of messages (whose organizational structure tends to be drastically changed) is made by a data shaper (whose operational behaviors are defined by a description file that includes multiple statements written in a customizable, tag-based interpreted language), the systems, methods and computer readable medium implementing the invention can quickly adapt to message changes.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a pictorial diagram illustrating an exemplary Web page that has been processed according to one embodiment of the present invention.

FIGS. 6A–6C are textual diagrams illustrating a number of files that contain programming examples using the exemplary customizable, tag-based programming language of the present invention for processing messages into publishable form for online presentation.

DETAILED DESCRIPTION OF A PREFERRED EMBODIMENT

Figure 1:
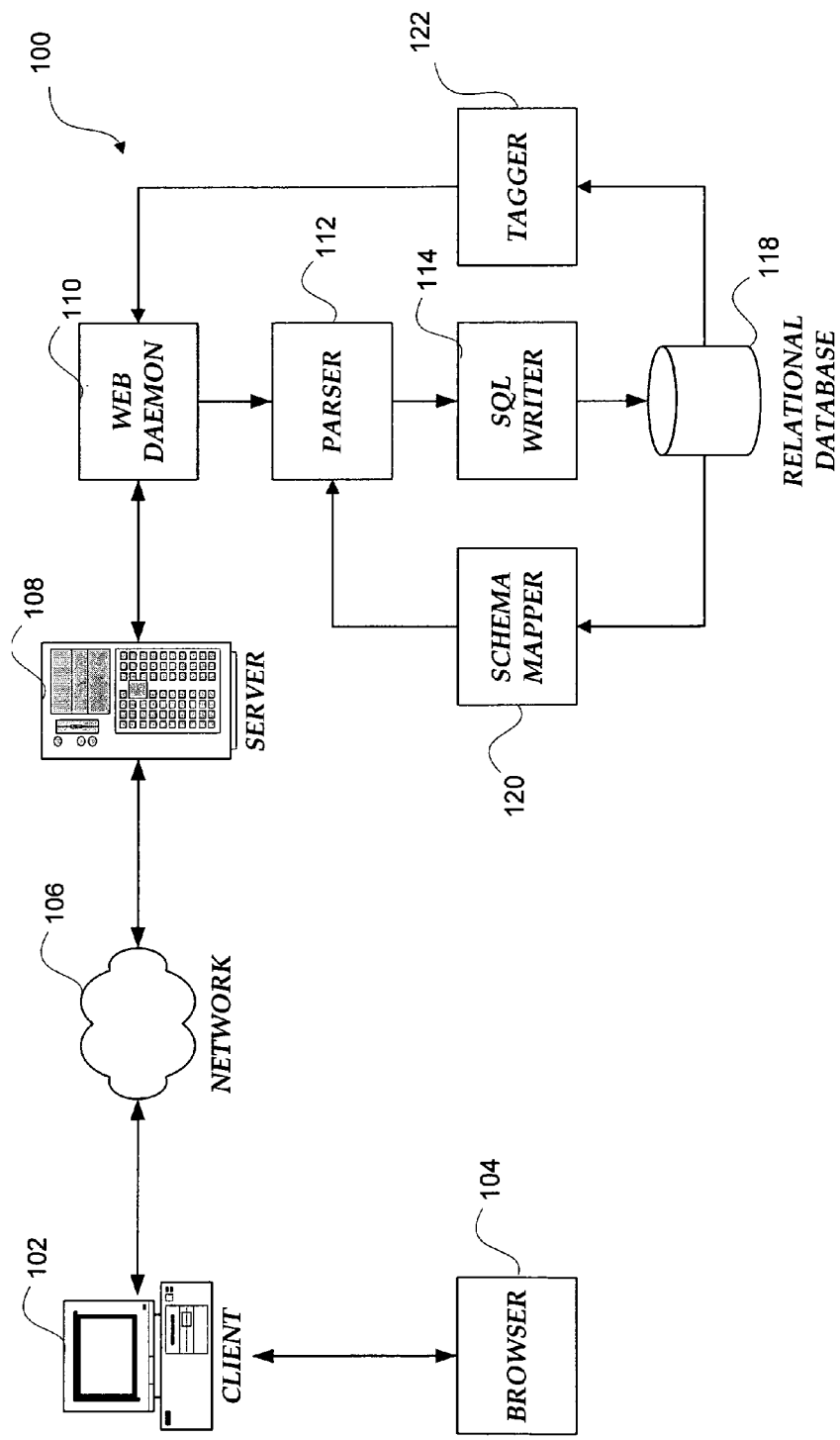
FIG. 1 is a block diagram illustrating a conventional system for processing XML-QL queries issued to a relational database.
Figure 2:
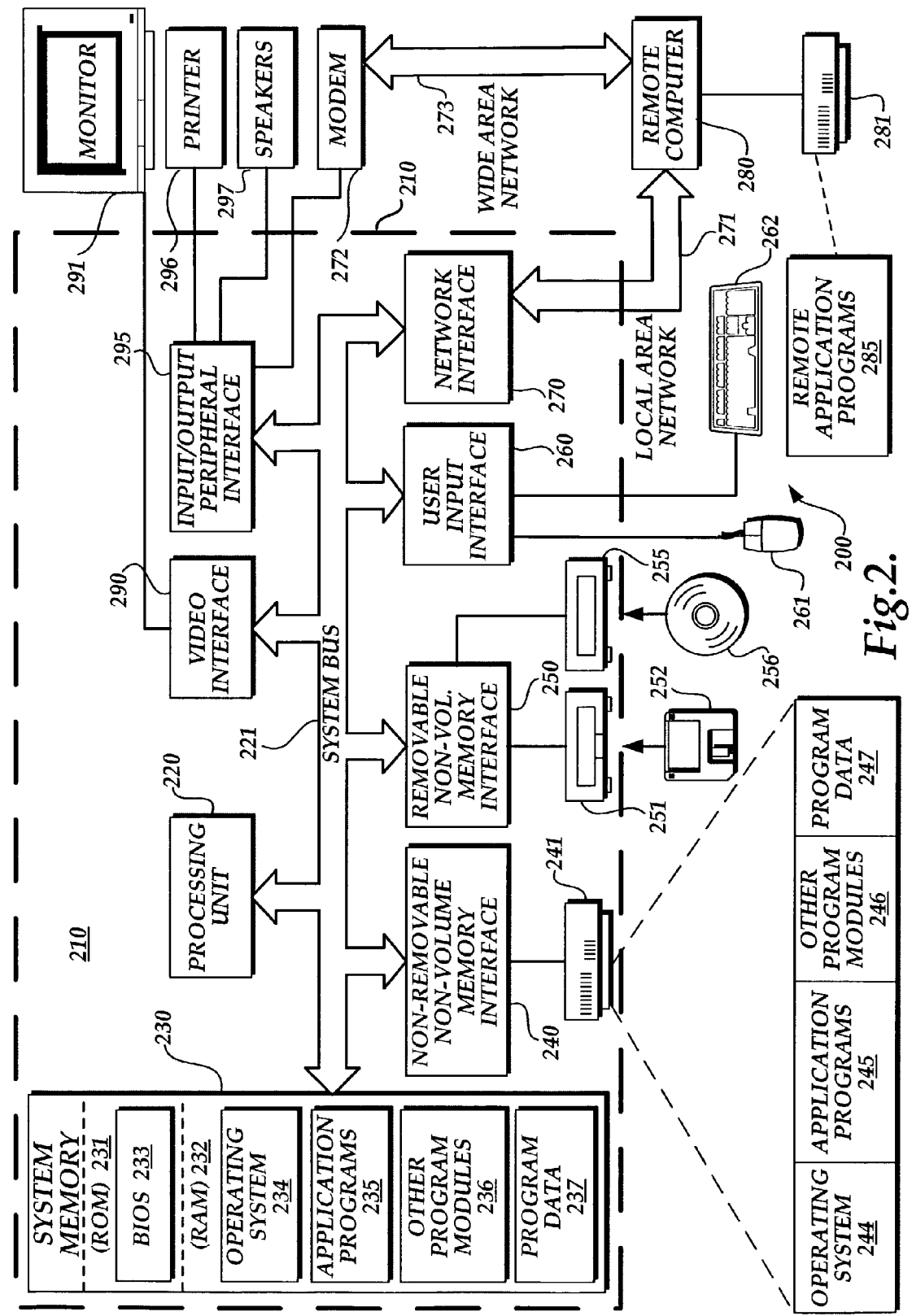
FIG. 2 is a block diagram illustrating an exemplary computing device.

FIG. 2 illustrates an example of a suitable computing system environment 200 for practicing certain aspects of the invention, such as processing messages generated in accordance with the invention and/or executing the hereinafter described data shaper. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

Aspects of the invention are also implementable in numerous other general purpose or special purpose computing system environments or configurations. Examples of well-known computing systems, environments and/or configurations that may be suitable for implementing certain aspects of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing system environment 200 is described in the general context of computer-executable instructions, such as program modules being executed by a computer. Generally, program modules include routines, programs, objects, components, data structures, etc., that perform particular tasks or implement particular abstract data types.

Aspects of the invention may also be practiced in distributed computing environments where tasks are performed by remote processing devices that are linked through a communications network. In a distributed computing environment, program modules may be located in both local and remote computer storage media, including memory storage devices.

The computing system environment 200 illustrated in FIG. 2 includes a general purpose computing device in the form of a computer 210. Components of computer 210 may include, but are not limited to, a processing unit 220, a system memory 230, and a system bus 221 that couples various system components, including the system memory, to the processing unit 220. The system bus 221 may be any of several types of bus structures, including a memory bus or memory controller, a peripheral bus, and a local bus using any of a variety of bus architectures. By way of example, and not limitation, such bus architectures include the Industry Standard Architecture (ISA) bus, Micro Channel Architecture (MCA) bus, Enhanced ISA (EISA) bus, Video Electronics Standards Association (VESA) local bus, and the Peripheral Component Interconnect (PCI) bus, also known as the Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embodies computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256, such as a CD-ROM, or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communications link between the computers may be used.

FIG. 3 illustrates an exemplary Web page 300 produced by a system formed in accordance with the invention that processes customizable, tag-based interpreted language messages having a structure of the type illustrated in FIGS. 5A–Z and described below. While the Web page 300 contains primarily information pertaining to sports events, the invention is not so limited. The present invention can be used to process for online presentation any news feeds, any live Internet broadcast, or any pieces of knowledge, intelligence, facts, or data having organizational structure that may drastically change over the course of the happenings of events.

The Web page 300 includes a brief weather report 301 that includes the day of the week, the date, the city, and the state of the weather with respect to heat or cold, wetness or dryness, calm or storm, clearness or cloudiness. Positioned under or below the weather report 301 is an image 302 that photojournalistically identifies a type of major news story. In this case an image is of a figure skater. Located within the immediate proximity of the image 302 is a primary headline 316 appearing in large type and giving the gist of a news story or article that is more fully presented when a user clicks upon links formed by the headline 316 or the image 302. Just below the primary headline 316 is a secondary headline 304 showing the main points of other news stories and articles. A tertiary headline 318 that summarizes other news stories and articles is also provided. All of the headlines form links that when activated cause related articles to be displayed for viewing by a user. A section header 306, generally shown in strong graphic presentation, separates elements below it from other parts of the Web page 300. A number of icons, images, or symbols 308A-308E present limited information about a particular event, such as a sports event, or inspiration stories or articles. When a user clicks upon one of the icons 308A–308E, detailed information about the related event is presented. Advertisements 308F, 310, which can be static or animated, are positioned so as to attract a user's attention and enhance a user's desire to patronize the products or services related to the advertisements. Like other elements on the Web page 300, the advertisements 308F, 310 contain links to other Web pages that are accessible by clicking on the advertisements.

A matrix 314 located next to the icons 308A-308E includes published content that may have just arrived from a news source, or arrived leisurely from a database or from other sources. A title 314A contains a brief, descriptive name for the matrix 314. A number of columns 314B–314F include multiple cells that contain detailed descriptions of published content. For example, column 314B describes nations that have, to date, earned medals at sports events such as the Olympic games. The first cell of column 314B identifies the purpose of the column, i.e., that the column identifies nations. Subsequent cells of column 314B contain a flag or some other indicia identifying a particular nation. Column 314C describes gold medal counts for each corresponding nation in column 314B. Column 314D describes silver medal counts and column 314E describes bronze medal counts for each corresponding nation in column 314B. Column 314F describes total medal counts for corresponding nations.

Superjacent to the matrix 314 is a matrix 311 including one column and two rows. The first column of the matrix 311 is a title 311A, which contains a brief, descriptive name for the matrix 311 ("On Air"). A number of bullet points, each containing a brief summary of a news story to be presented on the television channel, are located in the second row of the two rows. Like other elements on the Web page 300, each bullet point is clickable to bring a user to other Web pages containing the full story. Positioned above the matrix 311 is another matrix 313 containing one column and two rows. The first row of the matrix 313 is a title 313A, which contains a brief, descriptive name for the matrix 313 ("Live Now"). Like the matrix 311, the second row contains a number of bullet points highlighting sports events that are in the course of being performed by athletes. Again, each bullet point is clickable by the user to bring Web pages containing live content for the user's viewing experience. Also positioned nearby the matrix 313 are credits 312 in recognition of a news service for contributing news contents (being shown on the Web page 300).

Web page 300 is only one example of the many types of pages that can be used to show information contained in messages, which are processed by a system formed in accordance with the present invention. In the case of Olympic sports events, Web pages can show medal count by country; medal count by sport; medal winners by sport; medal winners by date; medal winners by country; athlete lists by sport; athlete lists by country; athlete bios; country profiles; judges' lists; and start lists. While sport Web page examples, in particular Olympic sport Web pages, are shown in the drawings, it should be understood that the invention can be used to process any type of information into publishable matter suitable for online presentation for many types of events, not just sports events.

Figure 4:
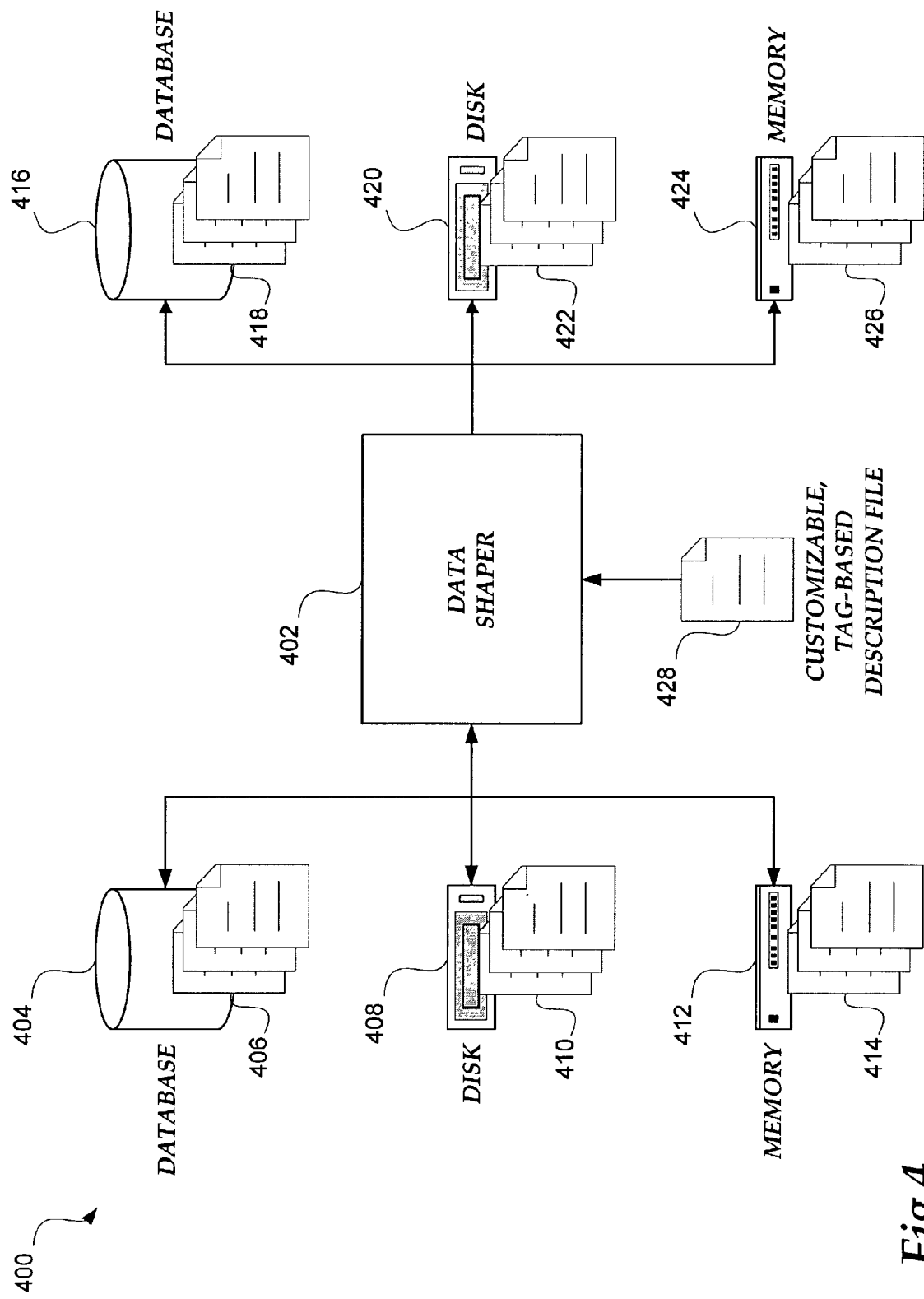
FIG. 4 is a block diagram illustrating an exemplary system that includes a data shaper formed in accordance with the invention for processing messages into publishable matter for online presentation.

FIG. 4 illustrates an exemplary system 400 formed in accordance with the invention for processing messages 406, 410, 414, whose organizational structures or schemes can change drastically depending on the happenings of events. These messages can be formed using any suitable tag-based languages, such as XML. The system 400 includes several sources of messages such as a database 404, a disk drive 408, and a memory device 412. Although only three message sources 404, 408, 412 are shown, the present invention contemplates other embodiments with more or fewer message sources as well as other sources not mentioned or illustrated here. The database 404 is a file composed of records (each containing fields together with a set of operations for searching, sorting, recombining, and other database functions), which is designed to store messages and process them into multiple tables (i.e., data structures characterized by rows and columns, with data occupying or potentially occupying each cell formed by a row-column intersection). The disk drive 408, as another source of messages, includes a floppy disk drive or a hard disk drive, among other storage devices. A memory device 412 is a device where information can be stored and retrieved, and in common usage, it refers to a computer's memory, which is a fast semi-conductor storage (RAM) directly connected to the processor of the computer, but can also include flash memory, memory cache, memory cards, and memory modules. Messages stored in the database 404, disks (not shown) in the disk drive 408, and the memory device 412 are retrievable by a data shaper 402.

The data shaper 402 is in essence an interpreter, which is either a computer program or a computing device, that translates and then executes each statement in a program written in an interpreted language. In this case, the program is contained in a description file 428 whose content comprises multiple programming statements written in a customizable, tag-based interpreted language (described below). The multiple programming statements in the description file 428 are translated into executable form and executed one statement at a time by the data shaper 402, rather than being translated completely (compiled) before execution. This allows the description file 428 to be quickly modified to adapt to drastic changes in messages 406, 410, 414, hence allowing the operational behaviors of the data shaper 402 to react with speed to corresponding changes in messages 406, 410, 414. Preferably, the data shaper 402 is a generic computing framework that is specialized by an instance of the description file 428 (each instance defines a different task) to perform a defined task. The data shaper 402 can be replicated to form multiple data shapers, each of which performs a specialized task, on a single computer server or can be scaled to multiple servers. The data shaper 402 becomes operative in a particular manner when it is instructed by the description file 428 and one or more messages 406–414. When the data shaper 402 is programmed by the description file 428 for the production of publishable matter, the data shaper 402 can be viewed as an automated, data-driven publishing platform. The data shaper 402 can be used to process any messages of any organizational structures or schemes by writing suitable instructions stored in the description file 428.

The description file 428 allows the data shaper 402 to produce initial results that are potentially faster than compiled software. The use of the description file 428 isolates the data shaper 402 from the specifics of the organizational structures or schemes of messages 406–414 and the semantics associated with such organizational structures or schemes. Because of this isolation, the operational behaviors of the data shaper 402 can be modified, augmented, or enhanced by different instances of the description file 428. For example, the data shaper 402 may have been originally programmed for processing Winter Olympics sports event messages by an instance of the description file 428. With another instance of the description file 428, the data shaper 402 can be reprogrammed to handle Summer Olympics sports event messages, any news feeds, or any live Internet broadcasts without fundamentally changing the data shaper 402.

The result of the processing of messages by the data shaper 402 is publishable matter, 418, 422, 426, of different structures and content suitable for online presentation. Publishable matter 418, 422, 426, once produced by the data shaper 402, can be stored in several storage sources such as a database 416, a disk drive 420, and a memory device 424. Publishable matter 418, 422, 426 can also be stored on the message supplying database 404, disk drive 408, and memory device 412. The present invention does contemplate other embodiments with more or fewer storage sources not mentioned or illustrated here.

The data shaper 402 supports database operations so that messages 406, 410, 414 and publishable matter 418, 422, 426 can be stored or retrieved from the databases 404, 416. The data shaper 402 is also capable of performing file operations, such as copying, moving, or deleting, on messages 406, 410, 414 and publishable matter 418, 422, 426 on disks in the disk drives 408, 420 or the memory devices 412, 424. Publishable matter 418, 422, 426 can be formed or be transformed by the data shaper 402 into a number of suitable publishable formats, such as XML, active server pages (ASP), and hypertext markup language (HTML), or any other publishable format that is tag-based.

The description file 428 provides a processing description to the data shaper 402 for the processing of messages 406, 410, 414. As indicated above, the description file 428 is written in a customizable, tag-based interpreted language, which allows the data shaper 402 to interpret (translate and execute statement by statement), in contrast to a compiled program, in which all statements are translated prior to any execution. The description file 428 is analyzed by the data shaper 402 and then the data shaper 402 executes each line or statement of the description file 428 one by one.

Figure 5A:
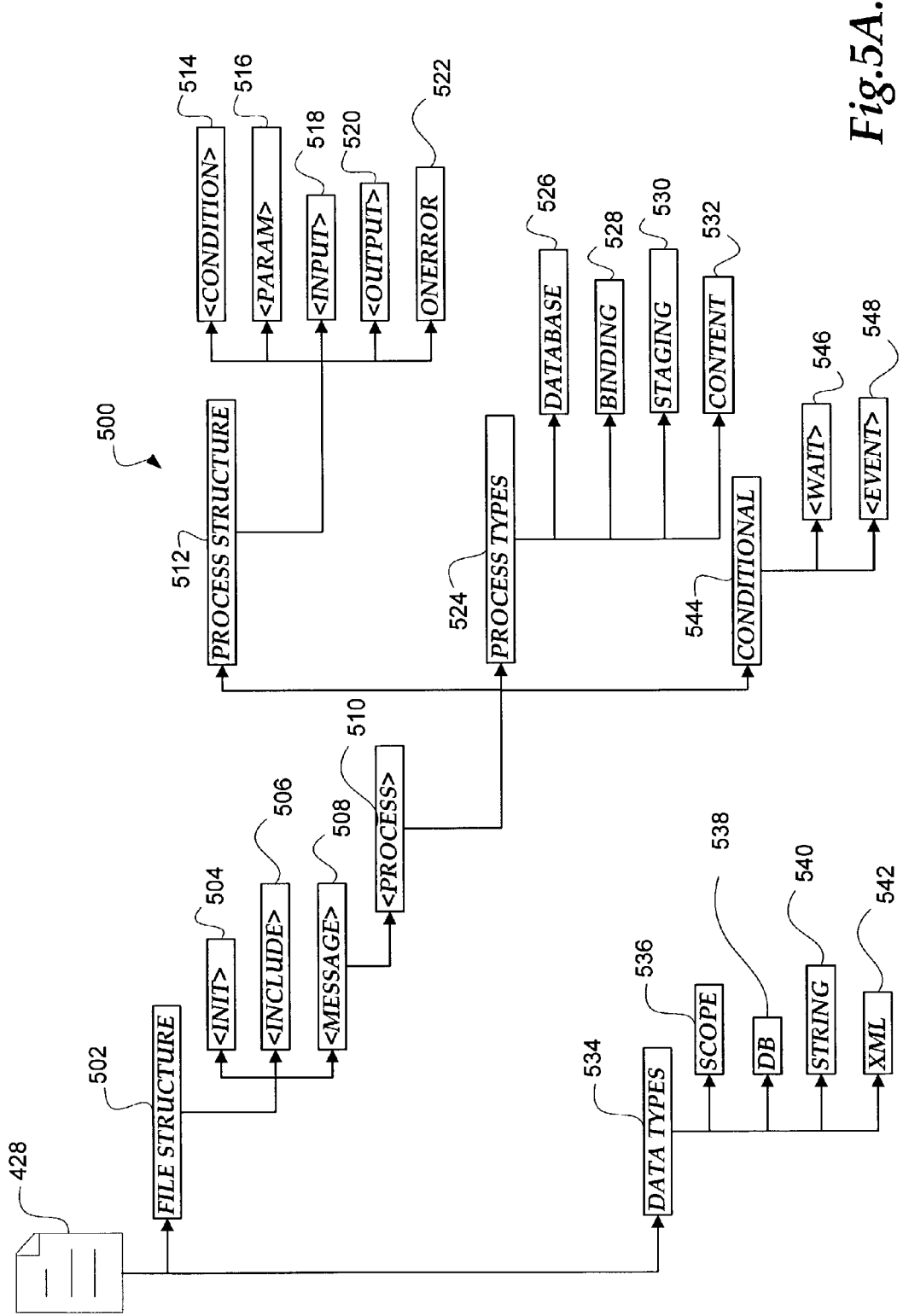
FIGS. 5A–5Z are block diagrams illustrating elements of an exemplary programming language, which is an artificial language that can be used to define a sequence of instructions that can ultimately be processed and executed by the data shaper for shaping data into publishable matter for online presentation.

The systematic means by which the description file 428 instructs the data shaper 402 to process messages (whose organizational structure can be mercurial), is the aforementioned customizable, tag-based interpreted language, which is shown in greater detail in FIG. 5A (broadly, element 500). The customizable, tag-based interpreted language 500 has several major structural areas: a file structure 502, which delimits the beginning and the ending of programmable instructions as well as major programming portions of the description file 428; a process structure 512, which defines the general format of the application programming interface for invoking various processes for processing data contained in messages by the data shaper 402; process types 524, which define various processes or operations that can be invoked; and data types 534, which define sets of data that specify the operations that can be performed on the sets of data. The processing instructions contained in the description file 428 for interpretation by the data shaper 402 are formed from the language 500. Elements of the language 500 can be used alone or can be combined into permutations to create greater functionality to express the processing nuances by the data shaper 402 to produce publishable matter for online presentation.

Figure 5F:
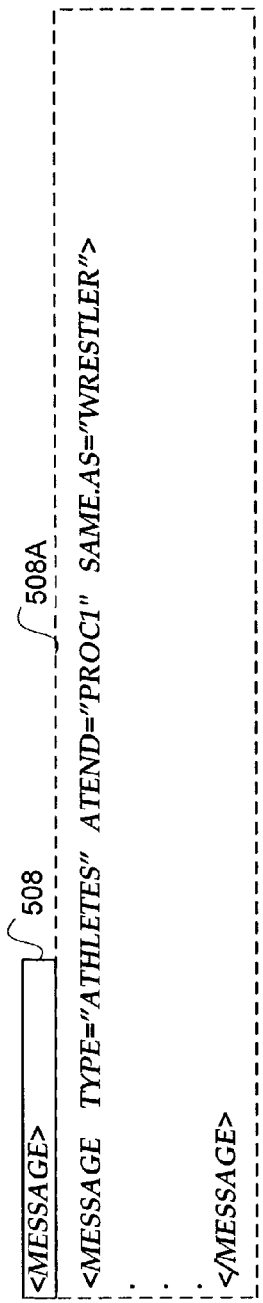
Figure 5G:
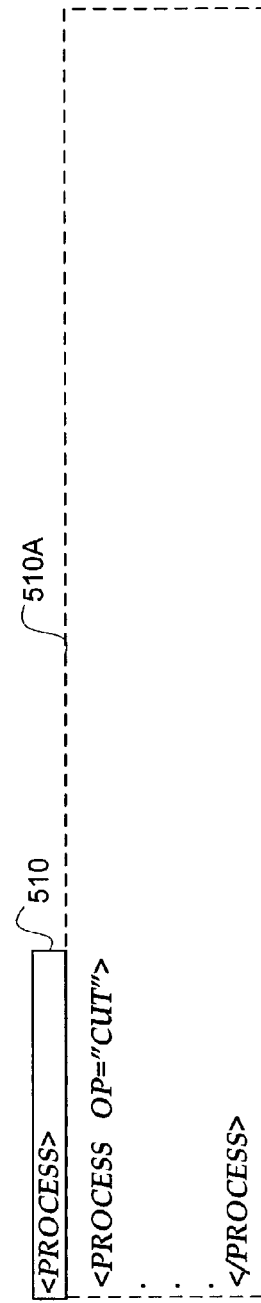
Figure 5H:
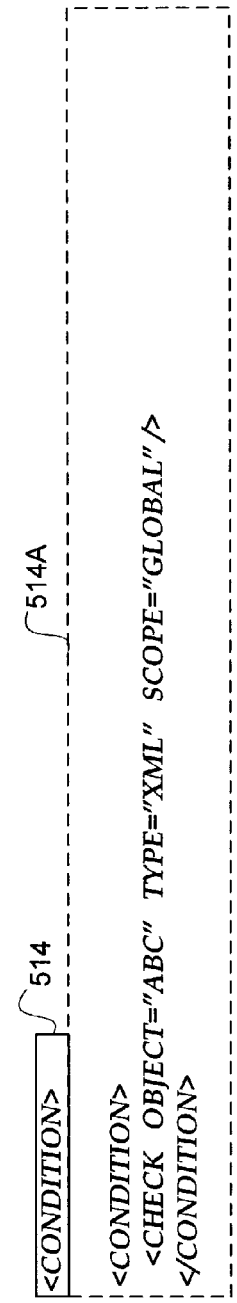
Figure 5I:
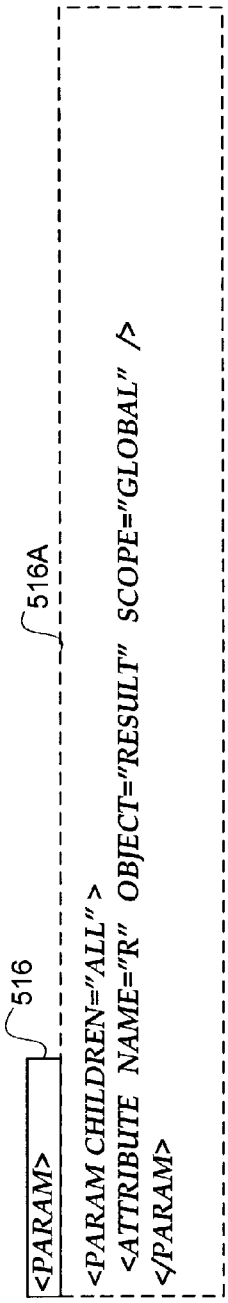
Figure 5M:
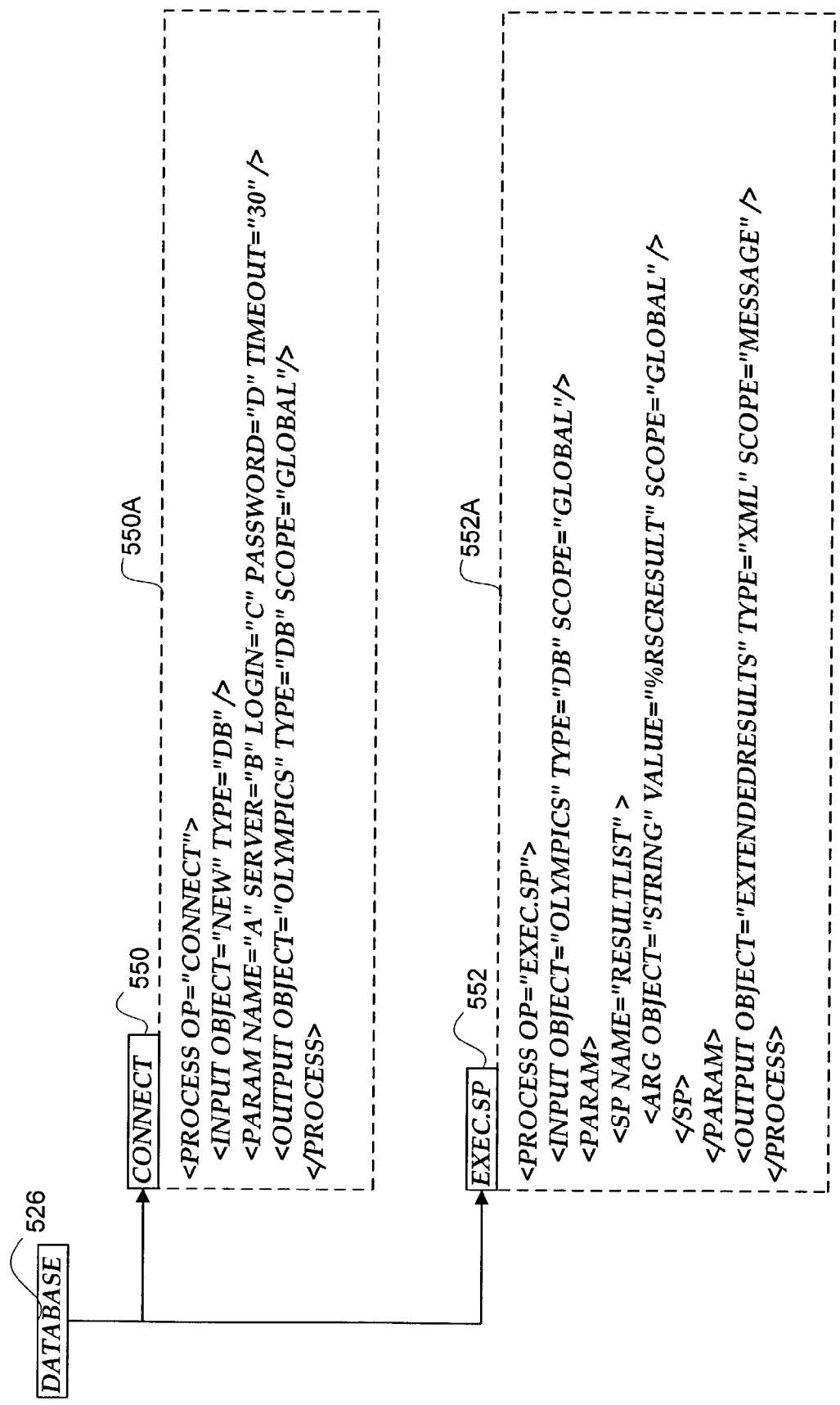

Data types 534 includes a database data type 538 ("DB" in the idioms of the language 500), a string data type 540 ("STRING"), and a data type 542 for handling customizable, tag-based data ("XML"). See FIG. 5Y. Each data type 538, 540, 542 has a scope 536. The scope 536 defines the lifetime of a variable or an object having a certain data type 538, 540, 542. There are two different scopes: global 583 and message 581. A variable or an object with the global scope 583 will persist as long as a thread that executes the description file 428 is running. A variable or an object with the message scope 581 will persist until a message, such as the message 406, has completed its processing. A number of programming examples 538A, 540A, and 542A are illustrated showing the use of corresponding data types 538, 540, 542. Example 538A illustrates one technique for creating a new variable or object called "olympics" of the database data type 538. Example 540A illustrates the creation of a new variable or object called "filesys" of the string data type 540. Programming example 542A illustrates the creation of a new variable or object called "simple results" of XML data type 542.

The file structure 502 delimits the beginning of the description file 428 for which the data shaper 402 would start to analyze with the use of a tag <process.description>. See example 502A of FIG. 5B. The ending of the description file 428 is delimited by a tag </process.description>. The tags <process.description>,</process.description> define a program block that contains other tags and programming instructions for the data shaper 402 to interpret for processing messages. Two optional attributes in connection with the tag <process.description> are available, "keep.message" and "debug." The attribute "keep.message" can be set to YES if a user desires to keep processed messages. When the attribute "debug" is set to YES the data shaper 402 logs its execution status to a file.

Nesting in the program block are tags <init> and </init> that define the beginning and ending of an initialization block 504. See example 504A of FIG. 5C. Nesting in the initialization block are one or more processes for immediate execution by a thread upon the completion of the reading of the description file 428 by the data shaper 402.

Existing within the initialization block 504 or existing outside it in the program block are one or more <include> tags 506. The entire program need not be located in the description file 428. Portions of the program can be placed in include files and these include files can be referenced via the use of the <include> tag 506 for automatic inclusion in the description file 428. An attribute "file" is associated with the <include> tag 506 whose content is the name of an include file for inclusion in the description file 428. Example 506A, as shown in FIG. 5D, illustrates the inclusion of an include file named "x01.inc." Example 507A in FIG. 5E illustrates that an include file delimits the portions of the program for inclusion in the description file 428 with a beginning tag <include> and an ending tag </include>. Program portions nesting between the tag <include> and tag </include> are copied into the description file 428 upon execution by the data shaper 402.

A message handler represents a message type processible by the data shaper 402 when it is programmed by the description file 428. A message handler block 508 is delimited by a beginning <message> tag and a corresponding ending </message> tag. See example 508A in FIG. 5F. The message handler block 508 includes an attribute "type" for defining the type of message to be handled or processed by the message handler block 508. An optional attribute "attend" is used to specify the name of a message handler to immediately follow the completion of the execution of a present message handler. As shown in example 508A, once the message handler for the type "athletes" completes its processing, a message handler named "proc1" is processed. Another attribute "same.as" allows a developer to indicate that a single message handler is to process two messages of different types. Thus, for example, the message handler for type "athletes" will be processed by the message handler for type "wrestler" if the "same.as" attribute is set to "wrestler" for the message handler for type "athletes." Messages that are received by the data shaper 402, such as messages 406, 410, 414 can contain instructions for inserting, modifying, or replacing message handlers in the customizable, tag-based description file 428. In other words, not only can a message contain data to be formed or transformed by the data shaper 402, the message can also contain instructions to modify the customizable, tag-based description file 428, hence changing the operational behaviors of the data shaper 402. This allows the customizable, tag-based description file 428 to be automatically enhanced, thereby allowing the behavior of the data shaper 402 to be changed on-the-fly without shutting down the system 400.

Each message handler block 508 encloses one or more processes. A process is the smallest unit of operation employed by the language 500. A process block 510 is delimited by a beginning tag <process> and a corresponding ending tag </process>. The <process> tag includes an attribute "op" whose content is an alphanumeric string that defines the type of operation to be performed by the process. Each process block 510 has a process structure 512, that essentially defines the signature of the process or the application programming interface of the process. Generically, nesting within each process block 510 are tags that define the application programming interface for the process; namely, an <input> tag 518, that describes an object on which the process operates; a <param> tag 516, that provides parameters for the operation of the process; an <output> tag 520, that defines an output variable for containing the result of the process; and optionally, a <condition> tag 514, that indicates the conditions for executing the process. The <input> tag 518 includes two attributes, "object" and "type." The attribute "object" indicates an object on which the process operates while the attribute "type" indicates the data type of the input object. See example 518A at FIG. 5J. The <param> tag 516 identifies optional parameters for the operation specified by the process. A parameter block 516 is delimited by tags <param> and its corresponding tag </param>. See example 516A of FIG. 5I.

The <output> tag 520 includes two attributes, "object" and "type." The attribute "object" of the <output> tag 520 indicates an object to use to reference the result of the processing while the attribute "type" indicates the data type of the object. Another attribute "scope" can be associated with the attribute "object" of the <output> tag 520 to indicate whether the object is to stay in memory through the lifetime of a thread, which is executing description file 428, or be cleared when the message has been processed. The attribute "scope" of the <output> tag 520 can be of type "temp," which means that the object is destroyed after the process has completed its execution. See example 520A at FIG. 5K.

A condition block 514 is delimited by a beginning tag <condition> and its corresponding ending tag </condition>. One or more <check> tags nesting within the condition block 514 specify the existence of certain objects as a necessary condition for the execution of the process. See example 514A at FIG. 5H. The <process> tag includes an attribute "onerror" 522 for specifying the level of error handling when there is an error in executing the process. If the attribute "onerror" is set to "skip" the data shaper 402 skips the remaining operations of the process without logging the error. Another option is for the attribute "onerror" to be set to "recover." In this case, the data shaper 402 forwards a message to a recovery queue when there is an error so that the message is reprocessed at certain intervals until successfully processed. Another option for the attribute "onerror" is "block," which means that the data shaper 402 blocks all further processes from executing until this process is successful executed. This is typically used to recover from database connection errors by the data shaper 402.

A process can be any one of several operation types 524, which include database processes 526, binding processes 528, staging processes 530, and content manipulation processes 532. These operation types 524 are mere classifications of a multitude of processes for convenient and have no bearing on the actual operations of processes. It should be understood that the multitude of processes as well as data types 534 can be extended. As discussed above, the <process> tag of the process block 510 includes an attribute "op" whose content is an alphanumeric string for defining a type of operation to be performed by the process. The content of the attribute "op" defines an operation type out of a number of operation types 524 for which the process executes. For example, to execute a database process for connecting the data shaper 402 to a database, this statement is placed in the description file 428: <process op="connect">. Thus, in the paragraphs below, it is the content of the attribute "op" that is the focus of the discussion.

The database processes 526 include a "connect" process 550 for making database connections and an "exec.sp" process 552 for executing stored procedures in a database. See FIG. 5M. A stored procedure is a precompiled collection of SQL statements and optional control-of-flow statements stored under a name and processed as a unit. Stored procedures are stored in an SQL database and can be run with one call from an application. Outputs from stored procedures in a database can be formed using a customizable, tag-based language, such as XML.

The "connect" process 550 creates a database connection. See example 550A at FIG. 5M. The invocation of the "connect" process 550 includes setting an attribute "object" of an input element to "new" and setting an attribute "type" to "db." A <param> tag included in the correct process has five attributes, each defining a parameter to form a connection with a desired database. An attribute "name" of the <param> tag indicates the name of a desired database to which to connect; an attribute "server" indicates the name of a database server, that mediates between the data shaper 402 and a database, such as database 404; an attribute "login" and an attribute "password" provide a security mechanism to access the database; and an attribute "timeout" specifies the number of seconds that are to elapse before a stored procedure in the database times out. The "connect" process 550 includes an <output> tag, which specifies the scope and name of a created database object.

The "exec.sp" process 552 is an operation for executing a stored procedure in a database, such as databases 404 and 416. See example 552A at FIG. 5M. The application programming interface for the "exec.sp" process 552 includes an <input> tag for specifying the database connection to use (which was created by the "connect" process 550). A <param> tag included in the "exec.sp" process defines parameters in connection with the execution of the "exec.sp" process 552. The <param> tag has a child tag <sp>, which indicates the name of a stored procedure to run using the attribute "name" of the tag <sp>. Additional arguments to the stored procedure are set off by an <arg> tag. The data types for the arguments of the <arg> tag can be either XML or string. The attribute "argtype" indicates the SQL data type for the arguments. Supported types for the attribute "argtype" include "varchar" for variable text; "nvarchar" for variable unicode text; "tinyint" for tiny integers; and "ntext" for fixed-length unicode text.

Figure 5N:
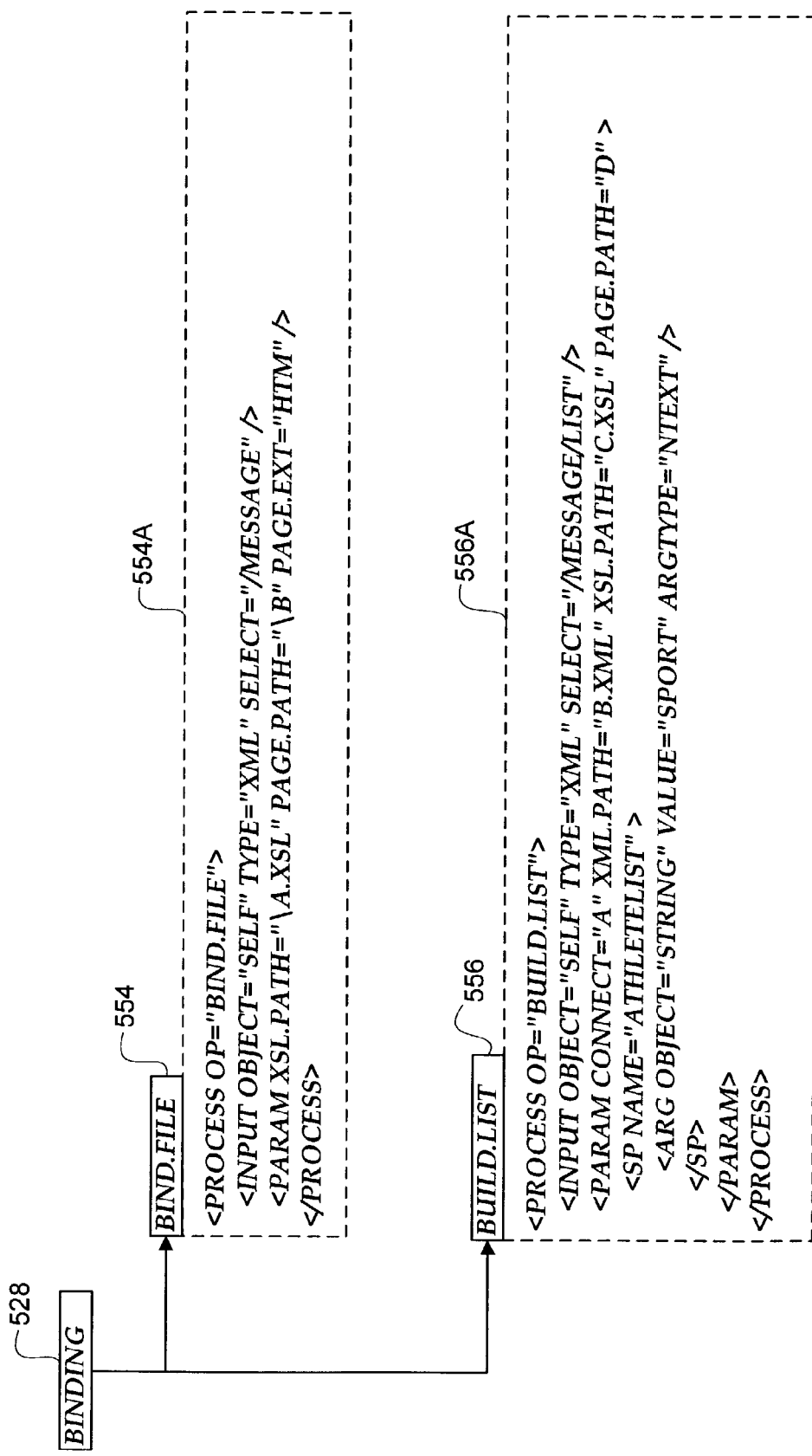
Figure 50:
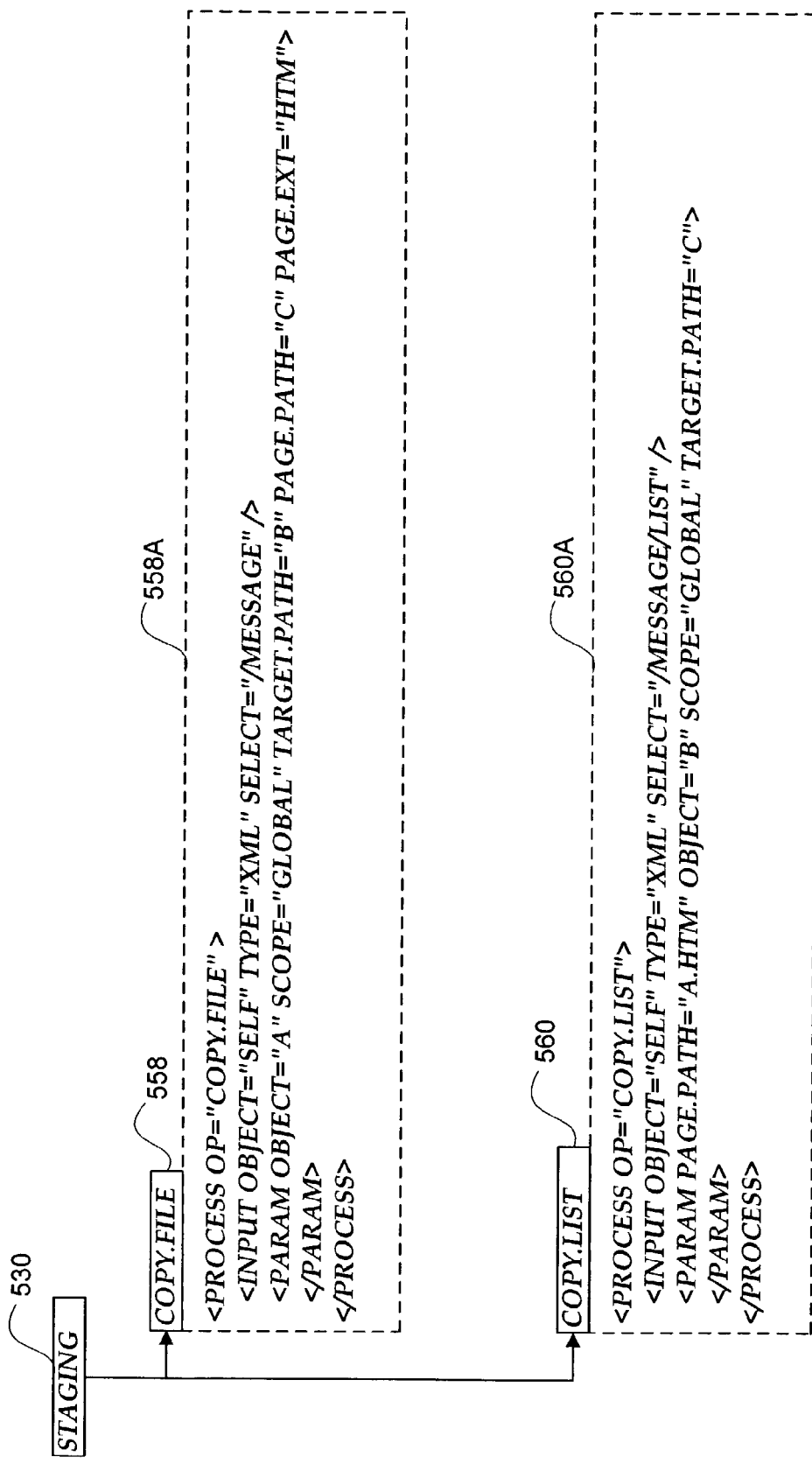

Binding processes 528 are illustrated in greater detail with reference to FIG. 5N. Binding processes 528 are responsible for binding publishable matter produced by the data shaper 402 with customizable, tag-based style files to produce desirable results in any format, such as HTML, XML, or ASP. The style files are formed from a customizable, tag-based language, such as XSL, and determine how the contents of the tag-based output files are displayed online by controlling what is displayed, in what format, and in what type, size, and style. Binding processes 528 include a "bind.file" process 554. See example 554A of FIG. 5N. This process binds publishable matter with a style file. The application programming interface for this process includes an <input> tag that specifies the message being processed. A <param> tag included in the "bind.file" process includes several attributes: "xsl.path," which indicates a full directory path name of a style file to use; "page.path," which names a directory path for the output file which contains the bound publishable matter; and "page.ext," which is an extension to be used for the output file.

Binding processes 528 also include a "build.list" process 556. See example 556A at FIG. 5N. The "build.list" process takes a list of items from a message and queries a database to produce a customizable, tag-based output before binding the list of items with a style sheet. An <input> tag aspect of the application programming interface of the "build.list" process 556 is usually the message, which contains a list of items being processed. The list of items are processed one by one according to a <param> tag.

The staging processes 530 are processes that are responsible for copying publishable matter, such as customizable, tag-based output files, to one or more staging servers. A staging server is a Web server where a Web developer or designer publishes and tests his ideas before putting them on a production server. These staging processes 530 can also be used on the staging servers to copy files to the production servers. The staging processes 530 include "copy.file" process 558, which copies publishable matter to one or more staging servers. See example 558A at FIG. 5O. An <input> tag aspect of the application programming interface for the "copy.file" process 558 includes an attribute "object," which generally references the message itself. A <param> tag aspect of the application programming interface specifies staging information, as well as the source and the destination directory path for storing and retrieving the Web pages.

The staging processes 530 also include a "copy.list" process 560. See FIG. 5O. The "copy.list" process 560 is a staging operation that copies a list of output files containing publishable matter to one or more staging servers. See example 560A at FIG. 5O. The "copy.list" process 560 is essentially the same as the "copy.file" process 558 except that the "copy.list" process 560 handles a list of output files instead of just one.

Figures 5P, 5Q:
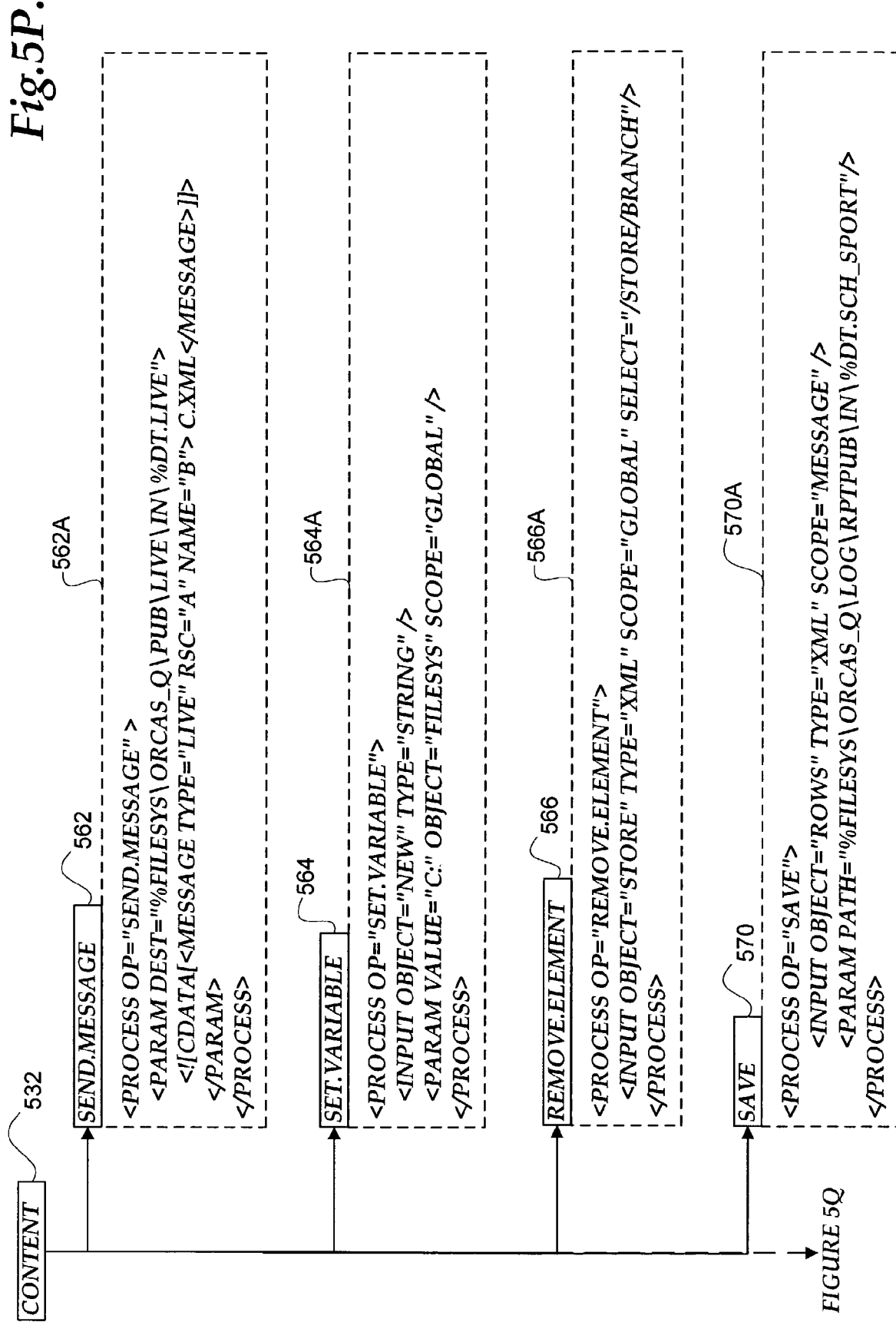
Figure 5Q:
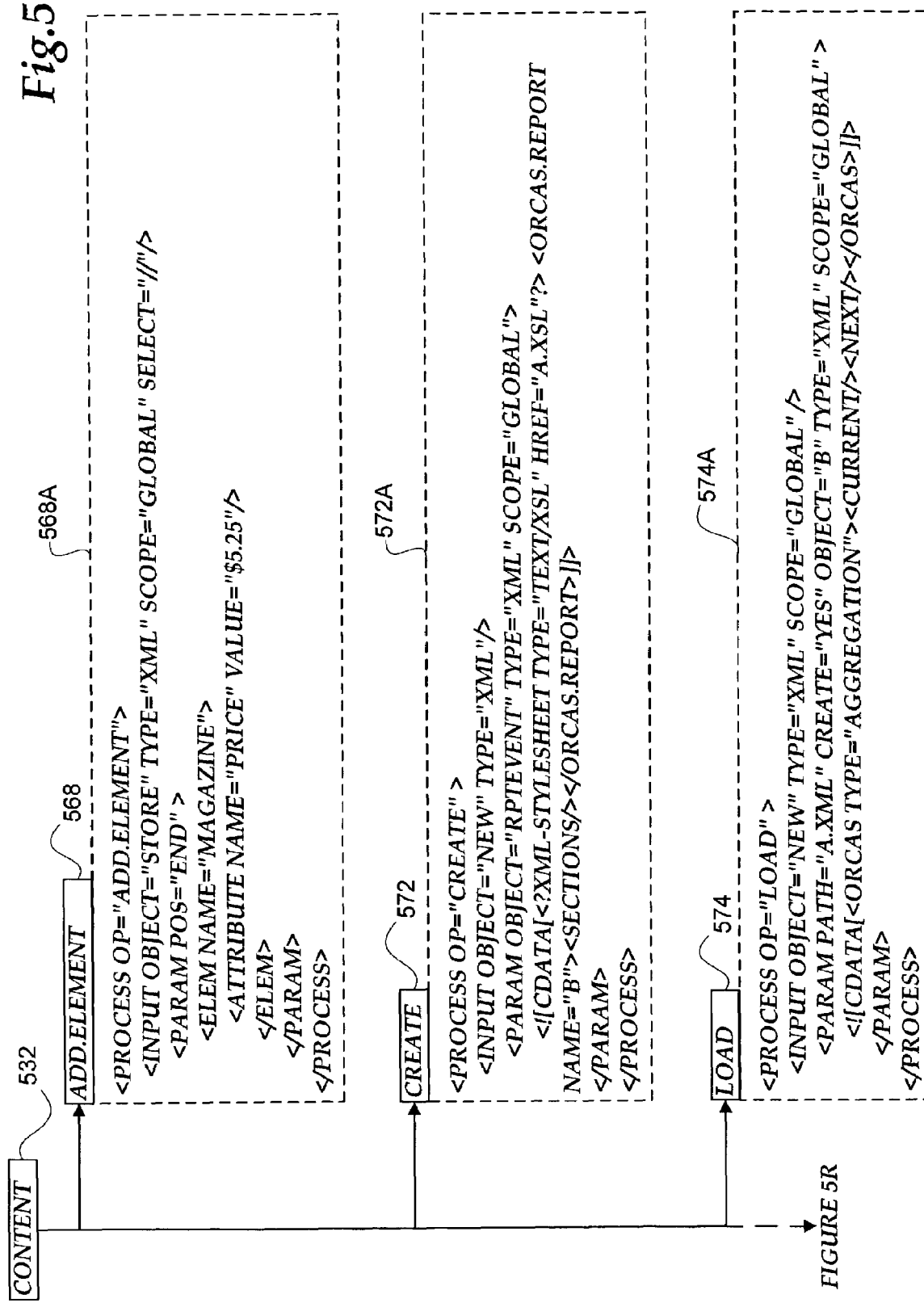

The content manipulation processes 532 are a set of operations aimed at manipulating the data in the messages 406, 410, 414. The data in these messages can be contained and described by a suitable customizable, tag-based language, such as XML. The content manipulation processes 532 include an operation "send.message" This operation sends a customizable, tag-based message to a path specified by a <param> tag aspect of the application programming interface of the "send.message" process 562. The message to send is enclosed in a character data tag <![CDATA[]]>. See example 562A at FIG. 5P. The content manipulation processes 532 also include a process called "set.variable" 564 which stores a string object as a variable. See example 564A.

The content manipulation process also includes a "remove.element" process. The "remove.element" process 566 is designed to remove one element from a tree data structure formed from a customizable, tag-based language. An <input> tag aspect of the application programming interface of the "remove.element" process 566 specifies the customizable, tag-based object and its context. The node indicated by the context is removed from the tree data structure. See example 566A. A "save" process 570 also included in the content manipulation processes 532 saves the tree data structure to a disk drive. An <input> tag of this process has an attribute "object" which is of an XML data type. A <param> tag of the "save" process specifies a full directory path where a customizable, tag-based object is to be saved. See example 570A.

The set of content manipulation- processes 532 also include an "add.element" process 568 for adding one or more elements to the tree data structure. See example 568A at FIG. 5Q. An <input> tag of the "add.element" process specifies a customizable, tag-based object and its context. A <param> tag has one attribute "pos," which indicates an insertion point for one or more new elements. The data shaper 402 inserts the new element to the end of a list if the attribute "pos" is set to "end;" otherwise, the data shaper 402 inserts the new element at the beginning of the tree data structure. The list of <elem> tags under the <param> tag are the elements to create for insertion into the tree data structure. Each <elem> tag may in turn have a list of attributes associated with it.

The content manipulation processes also include a "create" process 572, which creates a customizable, tag-based object in memory. See example 572A at FIG. 5Q. An <input> tag of the "create" process specifies a new customizable, tag-based object to be created. A <param> tag indicates the name, type, and scope of the variable or customizable, tag-based object to be created. The content of the <param> tag is the customizable, tag-based content used to create the variable or the customizable, tag-based object.

The content manipulation processes also include a "load" process 574, which loads a customizable, tag-based file from a disk drive. See example 574A at FIG. 5Q. An <input> tag of the "load" process specifies a new customizable, tag-based object to be created after the customizable, tag-based file is loaded from the disk drive. A <param> tag indicates a directory path of the customizable, tag-based file to be loaded from the disk drive. The attribute "create" specifies whether to create a new customizable, tag-based file if the originally specified file does not exist. The attribute "object" is the name of the created customizable, tag-based object. The content of the <param> tag is the customizable, tag-based content used to create the customizable, tag-based object if the customizable, tag-based file does not exist.

Figure 5R:
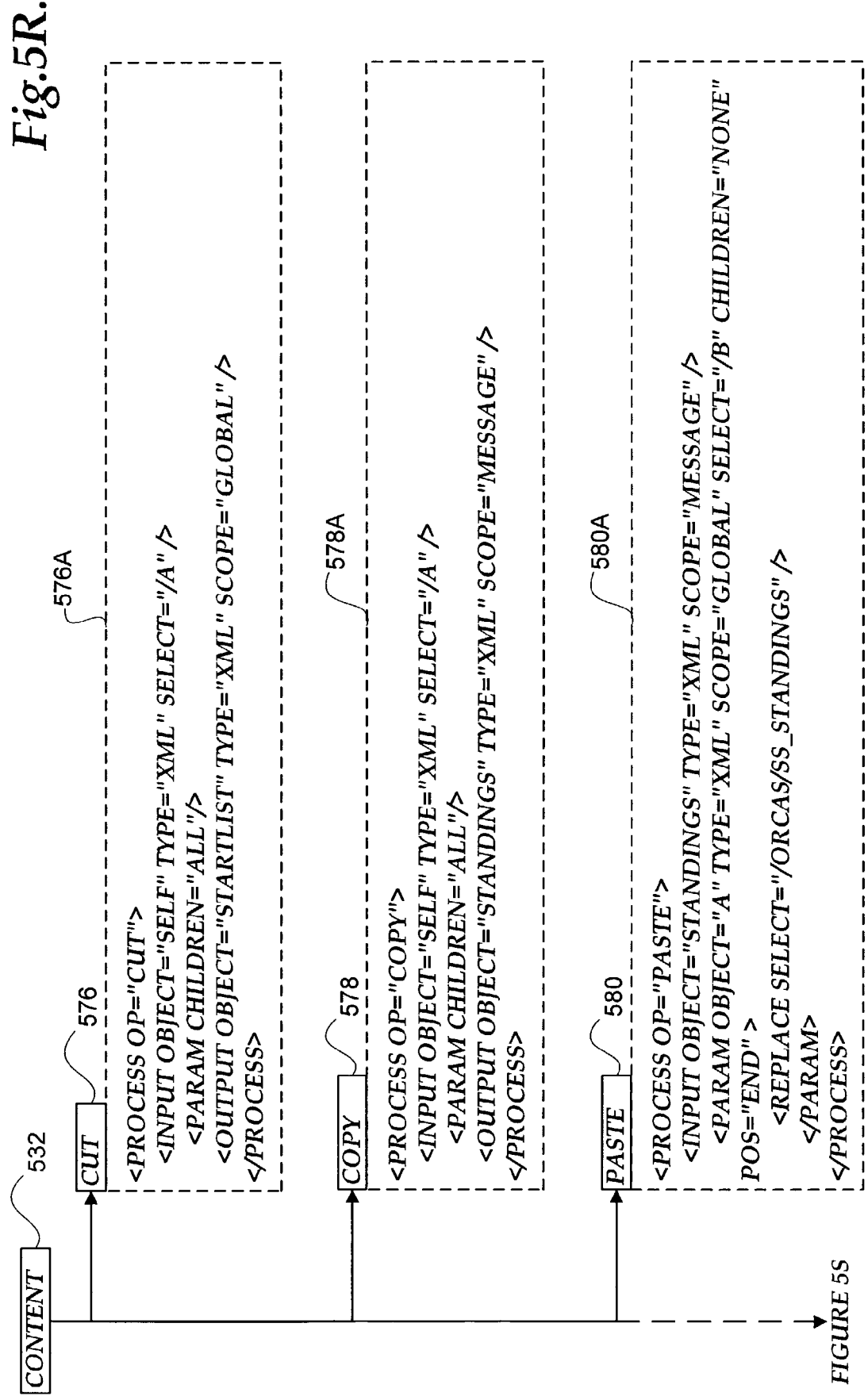

The content manipulation processes also include a "cut" process 576, which cuts a node (with or without its children) from the tree data structure. See example 576A at FIG. 5R. An <input> tag of the "cut" process specifies a customizable, tag-based object in its context. A <param> element contains one attribute "children" that indicates whether to include children of a node of the object in an output variable. An <output> tag names a customizable, tag-based output variable and associates it with a desired scope using the attribute "scope."

The content manipulation processes also include a "copy" process 578, which is similar to the "cut" process 576 except that the "copy" process 578 does not remove the nodes from the tree data structure. Instead, the copy process 578 makes a copy of the nodes. See example 578A at FIG. 5R.

The content manipulation process also include a "paste" process 580, which pastes an input object to a node specified by a <param> tag. See example 580A at FIG. 5R. An <input> tag of the "paste" process specifies the customizable, tag-based object and its context. The <param> tag indicates the target of the paste operation by using attributes "object," "type," and "select." The attribute "pos" dictates where the source object will be pasted (the content of the attribute "pos" includes "end," which means pasting to the end of the target parent's children, and "start," which means the beginning of the target parent's children.) The attribute "children" indicates whether to include the children of a node in the output. The default is to copy the children. If the attribute "children" is equated to "none," no children will be copied. The optional <replace> tag includes an attribute "existing." If the attribute "existing" is omitted or is set to "yes", this indicates that the node is to be replaced if the node already exists in the destination tree data structure. If the existing attribute is set to "no," it means that the node should be inserted only if the node does not exist already.

Figures 5S, 5T:
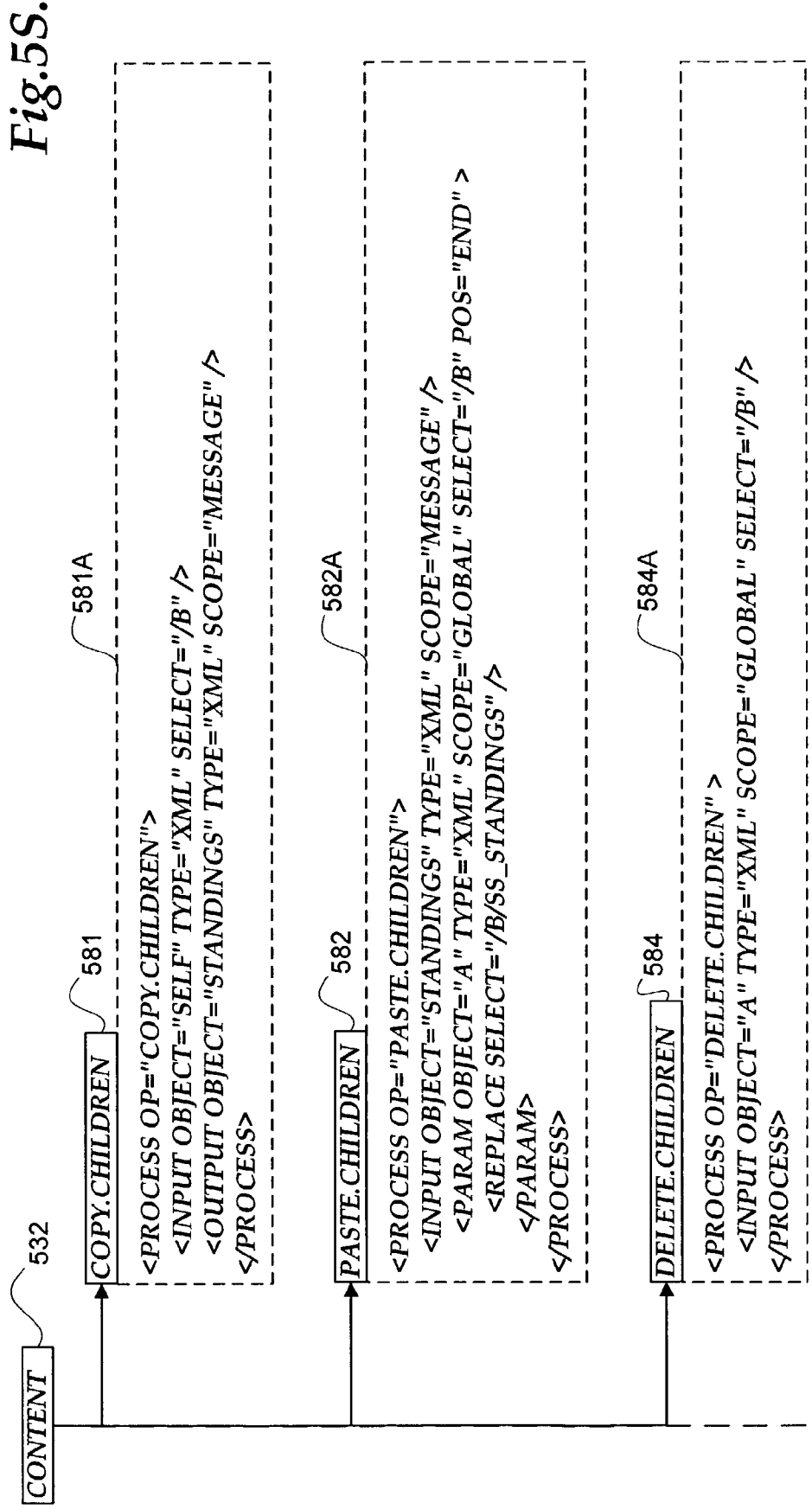
Figure 5T:
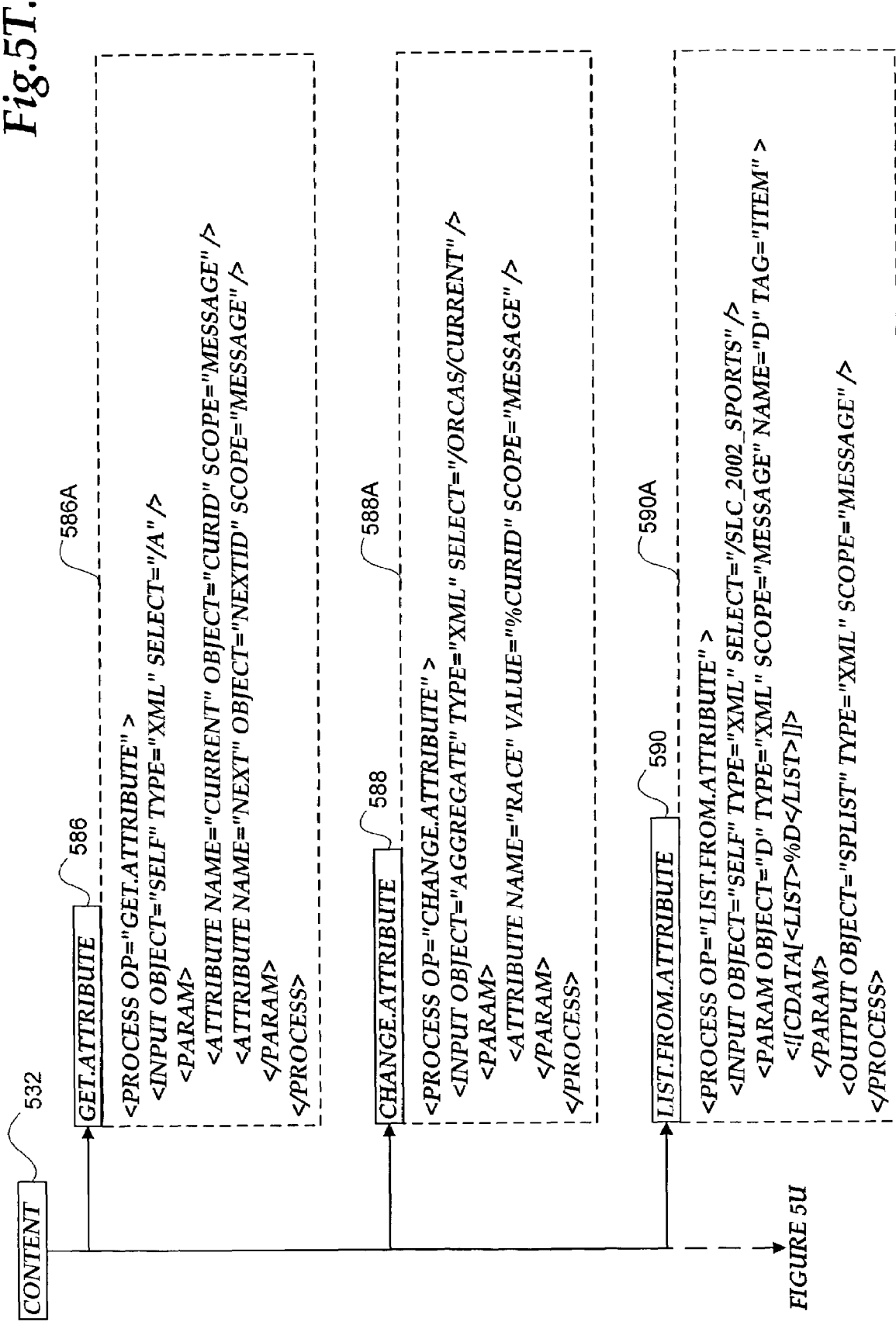

The content manipulation processes also include a "copy.children" process 581, which copies children nodes of a node in a tree data structure. An <input> tag of the "copy.children" process specifies the customizable, tag-based object and its context. See example 581A at FIG. 5S.

The content manipulation processes also include a "paste.children" process 582, which pastes all children nodes from a node in a source tree data structure to a parent node in a destination tree data structure. See example 582A at FIG. 5S. An <input> tag of the "paste.children" processes specifies the customizable, tag-based object and its context. A <param> tag indicates the target of the "paste.children" process 582 by using attributes "object," "type," and "select." The attribute "pos" dictates where the source object will be pasted (the content of the attribute "pos" includes "end," which means pasting to the end of the target parent's children, and "start," which means the beginning.) The optional <replace> tag indicates that the node is to be replaced if it already exists in the destination customizable, tag-based tree data structure.

The content manipulation processes also include a "delete.children" process 584, which removes children nodes of a node from a customizable, tag-based tree data structure. An <input> tag specifies the customizable, tag-based object and its context. See example 584A at FIG. 5S.

The content manipulation processes also include a "get.attribute" process 586, which gets one or more attributes from a node of a customizable, tag-based tree data structure. See example 586A at FIG. 5T. An <input> tag specifies a customizable, tag-based object and its context. A <param> tag indicates a list of attributes to retrieve. Each attribute is denoted by an <attribute> tag. The attribute "name" is the name of an attribute to be retrieved from the input context. The attribute "object" represents a customizable, tag-based string object to be created for the retrieved attribute. The attribute "scope" stipulates the variable scope.

The content manipulation processes also include a "change.attribute" process 588, which changes one or more attributes in a node of a customizable, tag-based tree data structure. See example 588A at FIG. 5T. An <input> tag specifies a customizable, tag-based object and its context. A <param> tag indicates a list of attributes to be changed. Each attribute is denoted by an <attribute> tag. The attribute "name" is the name of the attribute to change in the input context. The attribute "value" represents the value of the attribute and the scope of the attribute stipulates the variable scope.

The content manipulation processes also include a "list.from.attribute" process 590, which creates a list of items from an attribute of a customizable, tag-based tree data structure. See example 590A at FIG. 5T. An <input> tag specifies a customizable, tag-based object in its context. A <param> tag indicates how to build a list of attributes. An attribute "object" of the <param> tag is the name of a list variable to be created. The attribute "name" is the attribute that identifies the input object. The attribute "tag" specifies a tag with which to enclose a found attribute. The content of the <param> tag is the final result of this operation.

Figures 5U, 5V:
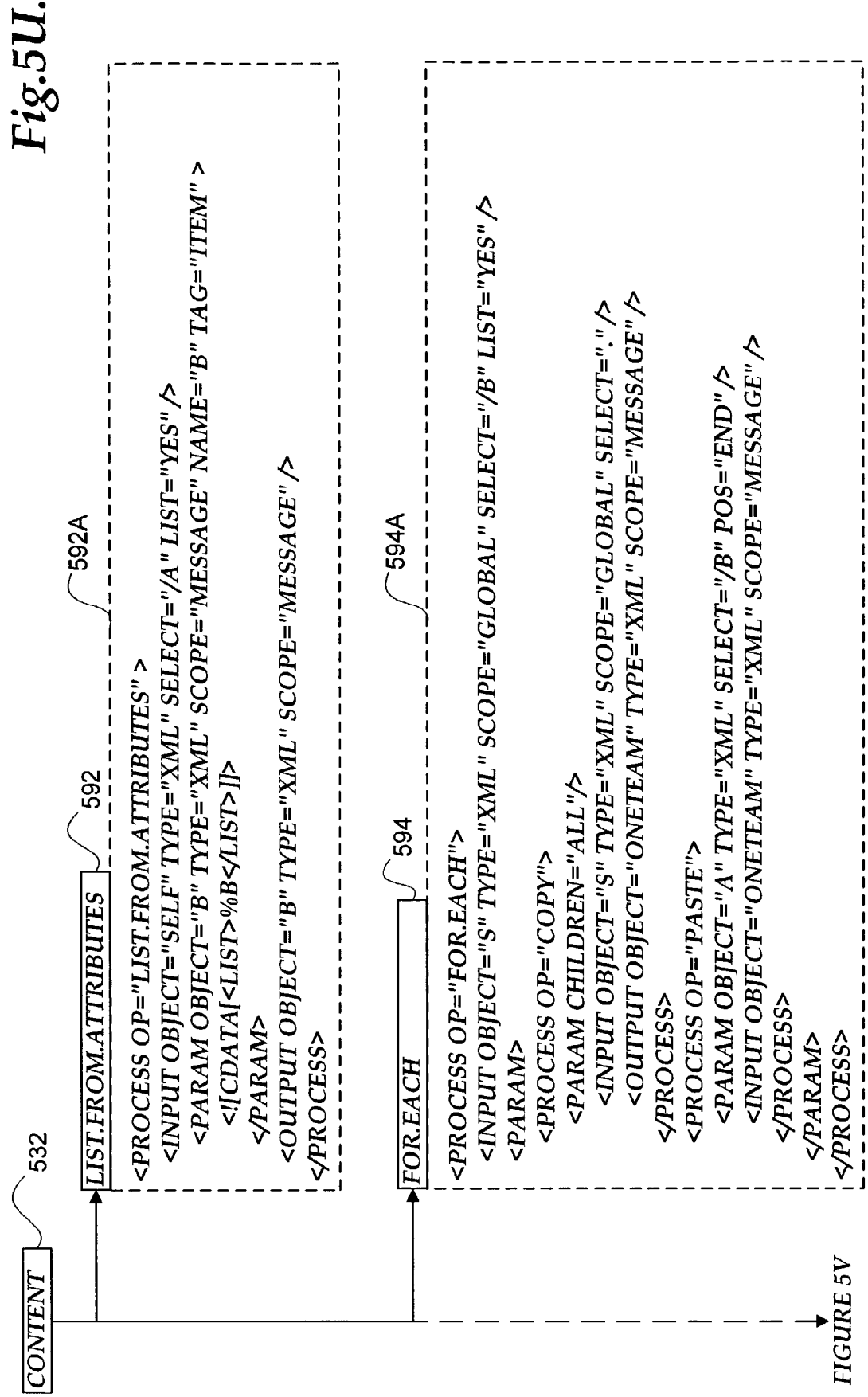

The content manipulation processes also include a "list.from.attributes" process 592, which is similar to the "list.from.attribute" process 590 discussed above. However, the "list.from.attributes" process 592 creates a list of items from one or more attributes, instead of one attribute of a node from a customizable, tag-based tree data structure. See example 592A of FIG. 5U.

The content manipulation processes also include a "for.each" process 594, which provides a way to iterate each child node of a parent node from a customizable, tag-based tree data structure. See example 594A at FIG. 5U. An <input> tag specifies a list of nodes. A <param> tag encloses one or more processes to run for each iteration. The context, as indicated by the "select" attribute of the input object used by the "for.each" process 594 preferably should not be changed.

The content manipulation processes also include a "transform" process 596, which provides a way to perform complicated transformation that may be difficult to achieve using content manipulation operations 532. See example 596A at FIG. 5V. An <input> tag specifies a customizable tag-based object and its context. A <param> tag indicates a style sheet, such as an XSL style sheet, to be used for the transformation. An <output> tag names the variable in which to store the result of the transformation.

The content manipulation processes also include a "get.text" process 598, which creates one string variable from the text of an element. See example 598A at FIG. 5V. An <input> tag specifies a customizable, tag-based object and its context. An <output> tag specifies the string object to be created.

The content manipulation processes also include a "get.child.text" process 599, which creates one or more customizable, tag-based string variables from a list of elements. See example 599A at FIG. 5V. An <input> tag specifies the customizable, tag-based object and its context. A <param> tag encloses a list of elements.

Figures 5V, 5W:
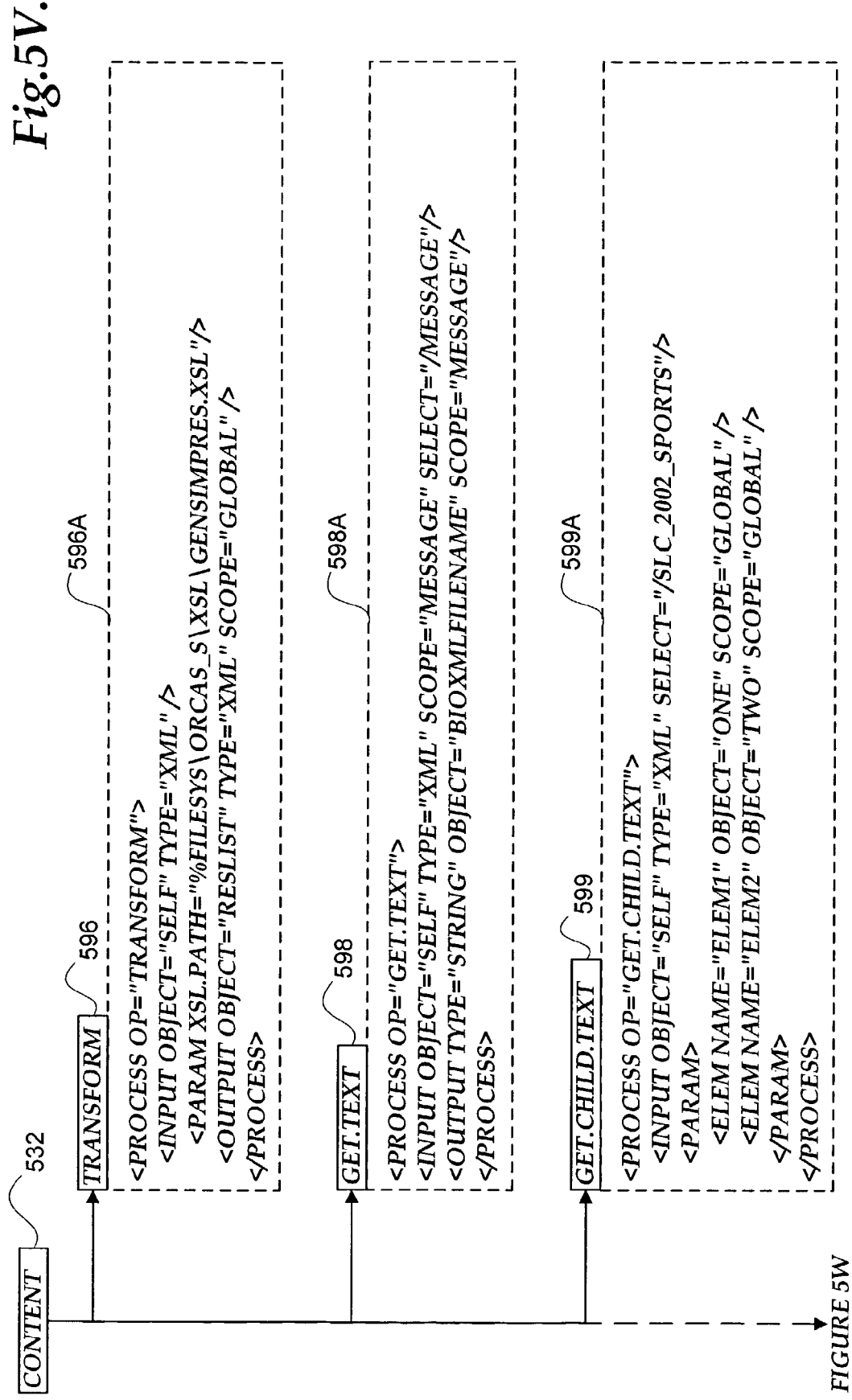

The content manipulation processes also include an "init.xpd" process 597, which allows a thread to read in at its whim the customizable, tag-based instruction file 428. Any customizable, tag-based object can be used as an input object. See example 597A at FIG. 5W.

The content manipulation processes also include a "persist" process 595, which copies content of an object to a disk drive so that its content can be restored in case of a system failure or for restoring an object without having to reconstruct it from scratch. See example 595A at FIG. 5W.

The content manipulation processes also include a "query" process 593, which provides a way to query for information from the data shaper 402. See example 593A at FIG. 5W. An attribute "object" indicates the message that carries the query parameter. An attribute "reply" specifies a queue path for the reply information. An optional attribute in the input context is the attribute "name," which indicates the type of the query.

The content manipulation processes also include an "element.tag" process 591, which gets the name of the element indicated by the attribute "object." An <input> tag specifies the object of interest. See example 591A at FIG. 5W.

Figures 5W, 5X:
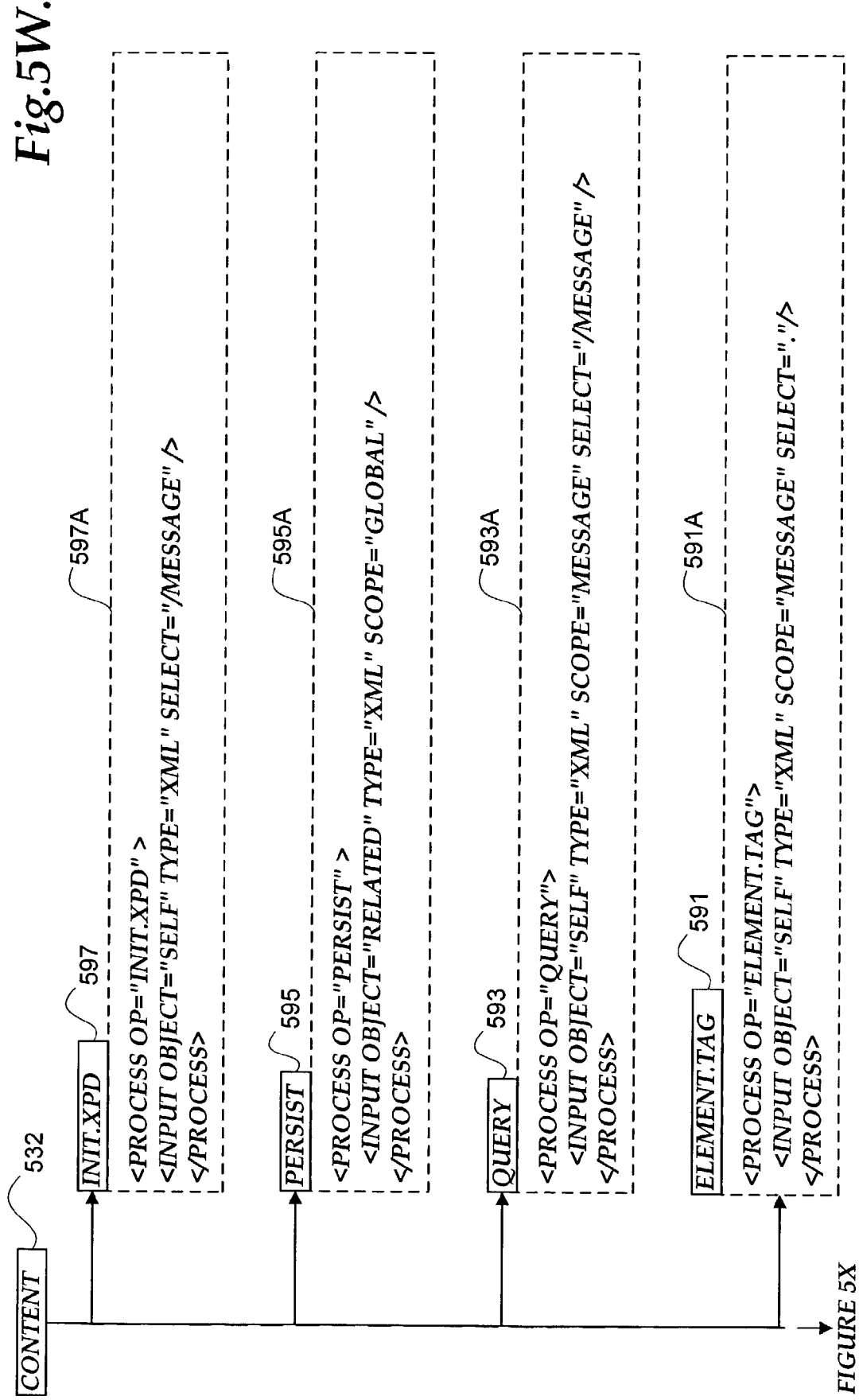
Figure 5X:
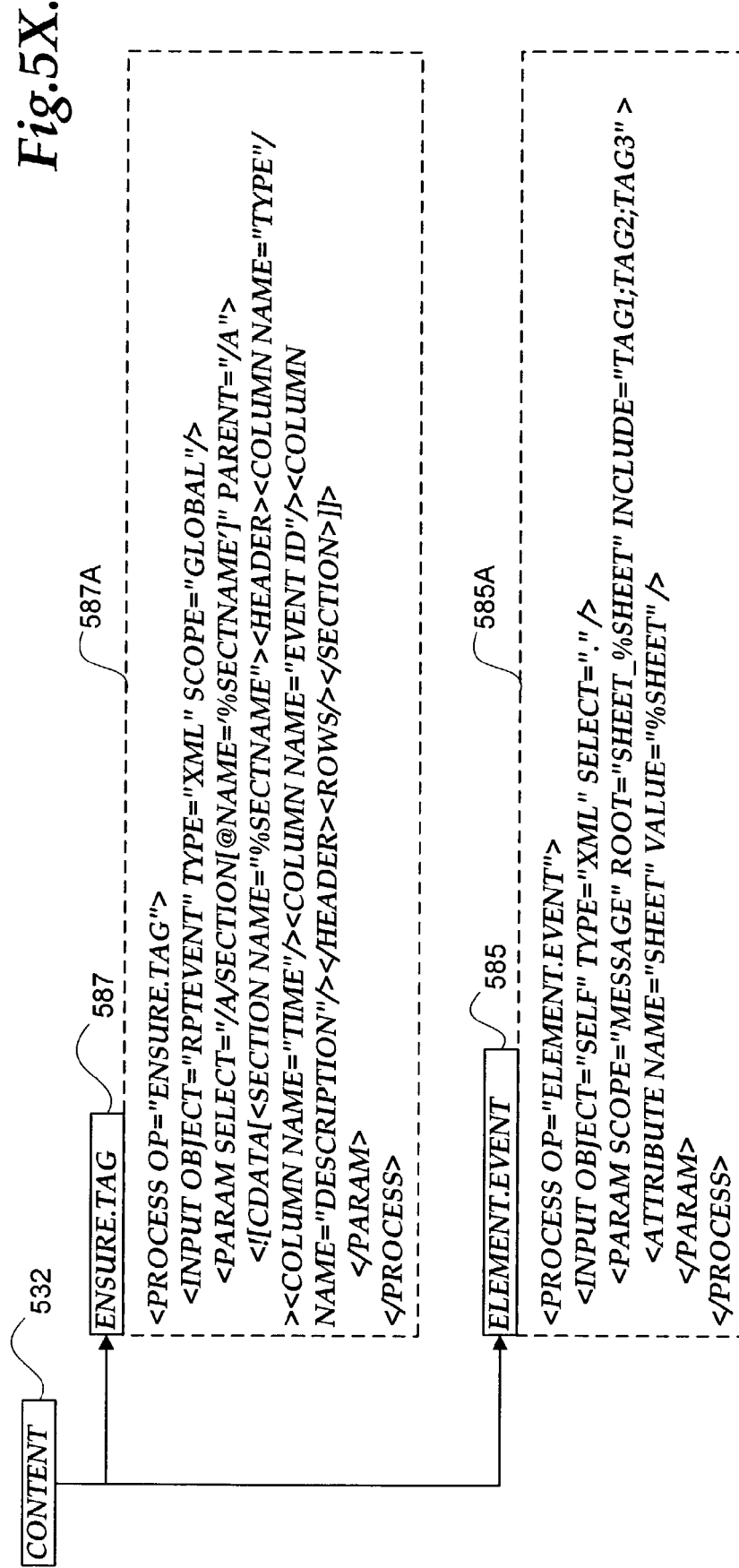
Figure 5Y:
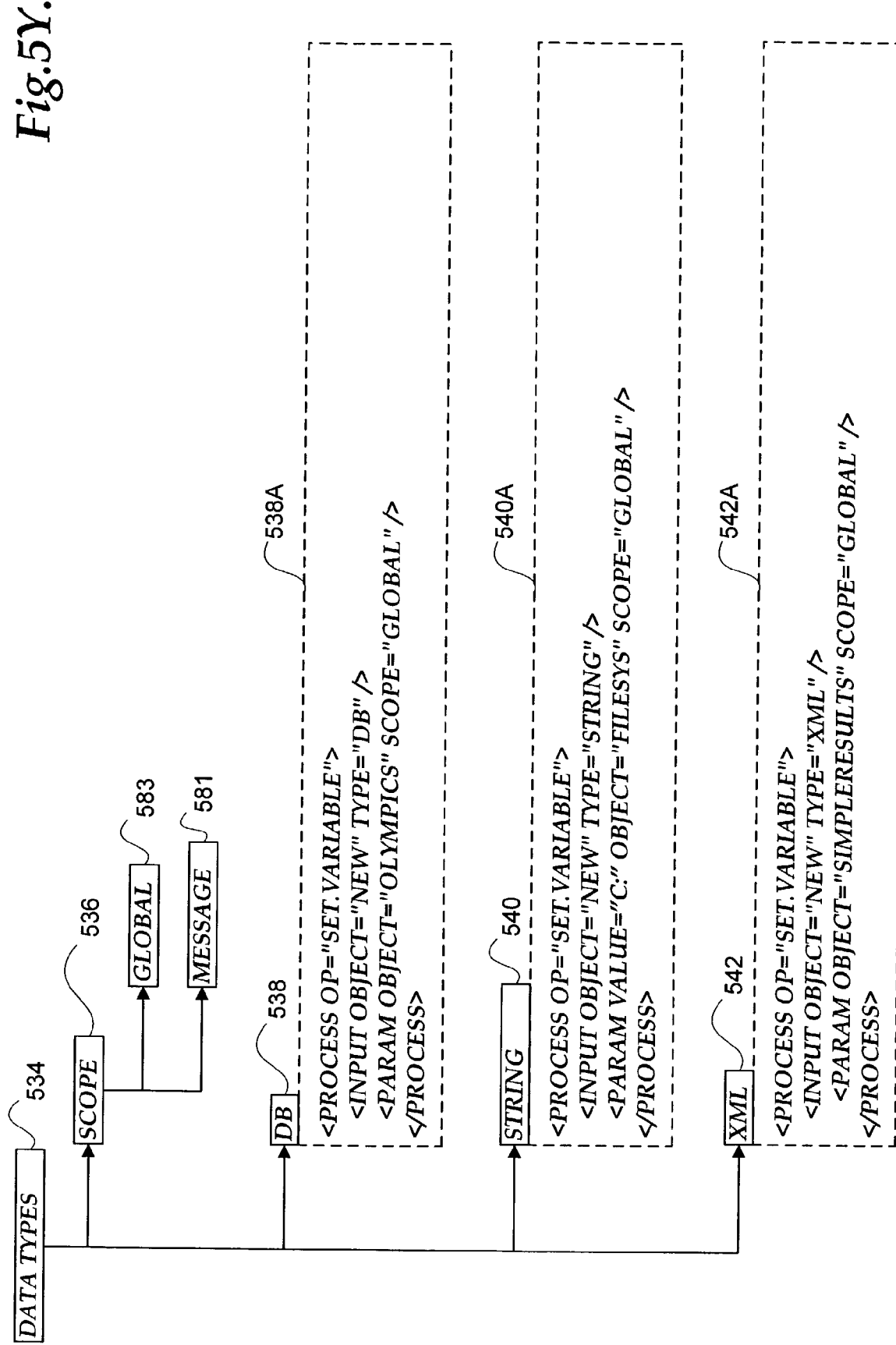

The content manipulation processes also include an "ensure.tag" process 587, which is used to make sure that a particular tag exists in a message. See example 587A at FIG. 5X. This operation will create the tag if the tag does not already exist. An attribute "object" specifies the object of interest. A <param> tag has an attribute "select" to indicate the node to check for the existence of the tag. If the node does not exist, the data shaper 402 creates a node using the content of the <param> tag.

The content manipulation processes also include an "element.event" process 585, which is used to issue an event for every element under the target node indicated by the <input> tag. A <param> tag element has three optional attributes: "scope," "root," and "include." The attribute "include" lists the names of the elements to be issued. If the attribute "include" is omitted, each element invokes an event of the same name. The attribute "scope" specifies the scope of the event variables (message scope is the default). The attribute "root" indicates the name of the root element to use for the event variables. Optionally, there can be list of attributes under the <param> tag. These attributes are added when an event is invoked and the event variable is created. That is one way to pass additional attributes to the event handler. See example 585A at FIG. 5X.

Sometimes the execution of one or more processes is based on some predefined events. The language 500 allows a way to do that. This is accomplished using two tags in the customizable, tag-based instruction file 428: <wait> and <event>. A wait block 546 is delimited by a beginning tag <wait> and a corresponding ending tag </wait>. The wait block 546 defines the event for which a process is executed upon the firing of the event. An event block 548 is delimited by a beginning tag <event> and a corresponding ending tag </event>. The event block 548 encloses the process to be performed upon the firing of an appropriate event. As discussed above, the wait block defines the name of an event and flags that will affect the firing of the event. The attribute "name" indicates the name of the event. The attribute "auto.reset" specifies whether the flags will be reset after the firing of the event. The attribute "limit" states whether a developer wants to limit the number of times the event is fired. The attribute "limit" is set to zero if there,is no limit in the number of times the event is to be fired. The attribute "any.flag" indicates whether the event is to be fired when any flag is raised. See examples 546A, 548A at FIG. 5Z.

The <event> tag 548 is similar to the <message> tag 508. Each <event> tag has an attribute "type" that serves as the name of the event. The content of the attribute "type" should be the same as the name used in the <wait> tag. The processes inside the <event> tag are the ones that would be executed when an event of an appropriate type is fired by the <wait> tag. The <event> tag, like the <message> tag 508, allows the use of the attribute "attend" to specify what to do when the event handler has finished the enclosed processes. See examples 546A, 548A at FIG. 5Z.

Figure 7A:
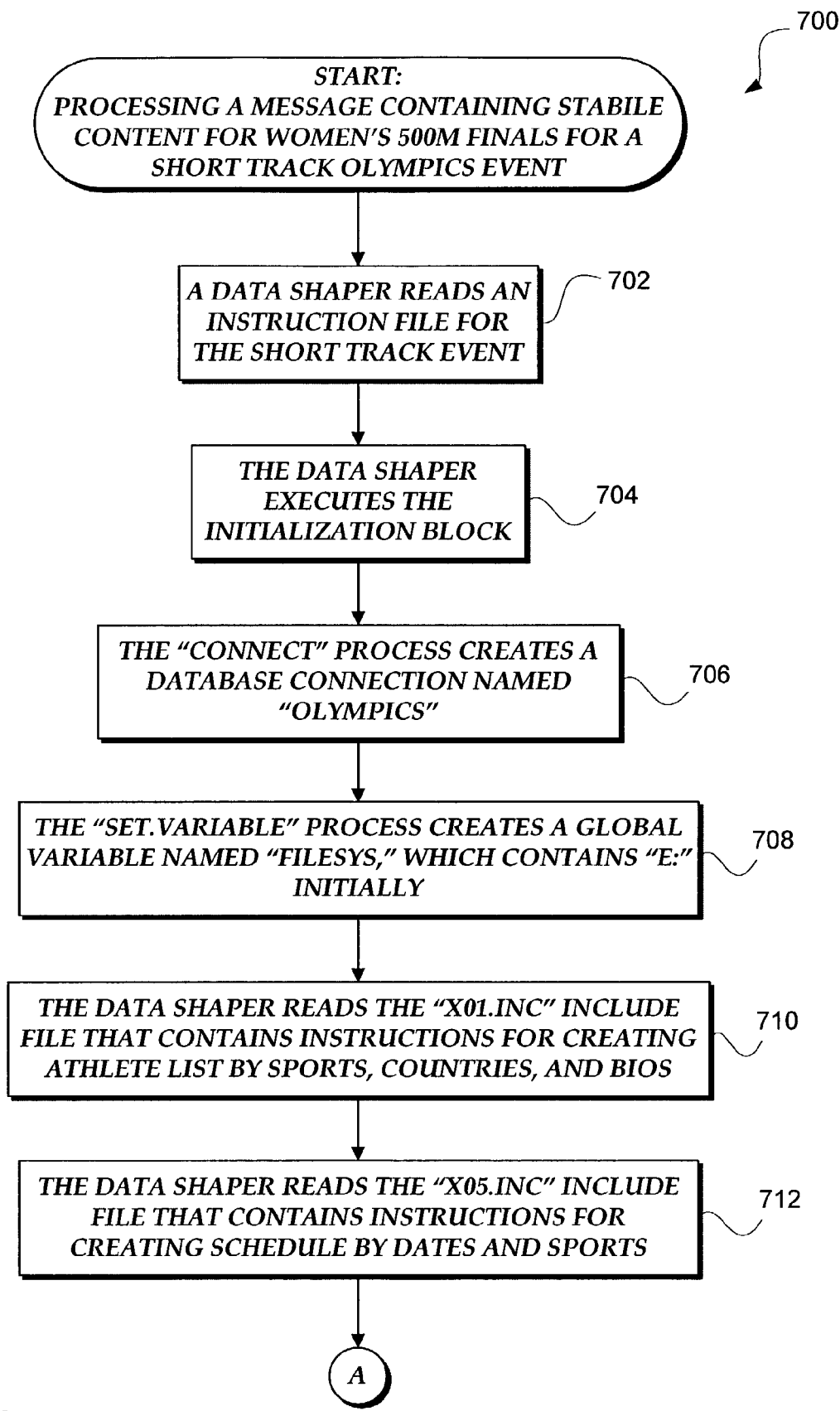
FIGS. 7A–7C are process diagrams illustrating an exemplary method formed in accordance with this invention for processing messages into publishable form suitable for online presentation at multiple Web sites.
Figure 7B:
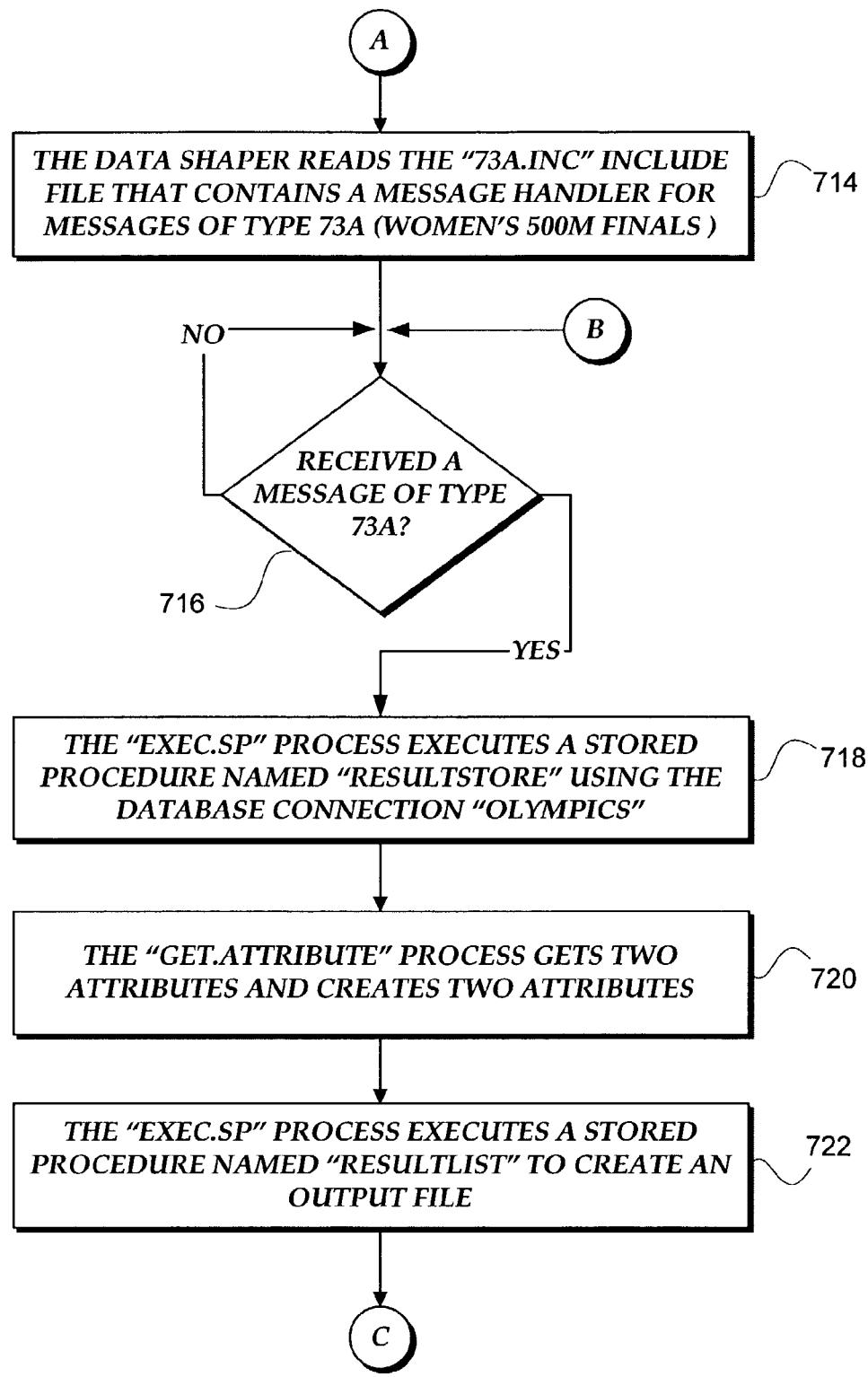
Figure 7C:
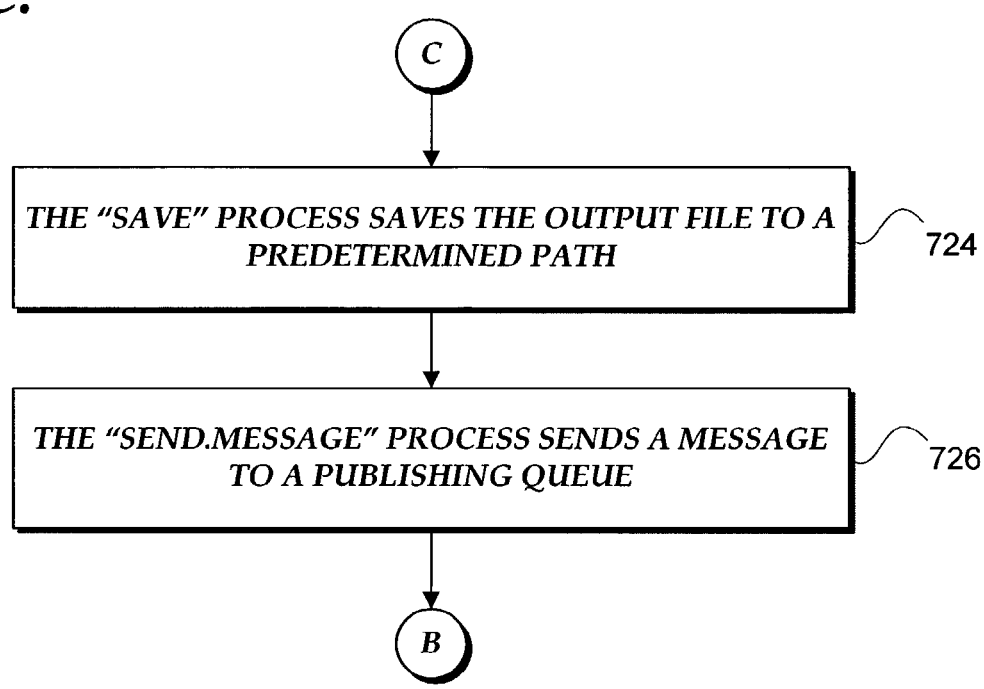

FIGS. 7A–7C illustrate a process 700 for processing a message containing data for women's 500-meter finals for a short track Olympics event. The discussion of the process 700 is presented merely to show an instance of the expressiveness of the language 500 whose architecture is illustrated in detail in FIGS. 5A–5Z, and described above. Various elements of the language 500 can be combined to form a description file, such as the description file 428, that is suitable to instruct the data shaper 402 to process messages, such as messages 406–414, into publishable form for online presentation. The process 700 is an illustrative example only, and is not meant to limit the invention. For clarity purposes, the following description of the process 700 makes references to various elements illustrated in connection with program files shown in FIGS. 6A–6C and described below.

From a start block, the process 700 proceeds to a block 702 where the data shaper 402 (or a thread executing on behalf of the data shaper 402) reads the description file 428 for processing a short track event message. Digressing, one exemplary illustration of the description file 428 is a file 600 shown in FIG. 6A. The file 600 includes a statement 602, which identifies the XML version to be used as well as the encoding scheme of the file 600. Statements 604, 622 define the program block 502 within which are nested other statements for the data shaper 402 to process the short track event message.

Returning to FIG. 7A, the data shaper 402 executes the initialization block 504 which is defined by statements 606, 612 (See FIG. 6A). The initialization block 504 comprises an include statement 608 that causes the data shaper 402 to include program portions stored in another file named "init.inc" (file 624 at FIG. 6B). Statements 626, 636 of file 624 define an include block.

Returning to FIG. 7A, the "connect" process 500 creates a database connection named "olympics." See block 706. Digressing, nested within the include block is a "connect" process 500 declared by statements 628, 630. See FIG. 6B.

Returning to FIG. 7A, the process 700 enters block 708 where the "set.variable" process 564 creates a global variable named "filesys," whose content contains an alphanumeric string "e:". Digressing, this "set.variable" process 564 is defined within the include block between statements 632, 634. See FIG. 6B.

Returning to FIG. 7A, next, the data shaper 402 reads the "x01.inc" include file that contains instructions for creating athlete lists by sports, and countries, as well as athlete bios. See block 710. Digressing, a statement 614 of file 600 declares the inclusion of the "x01.inc" file. See FIG. 6A.

Returning to FIG. 7A, the data shaper 402 reads the "x05.inc" include file that contains instructions for creating schedules by dates and sports events. See block 712. The process 700 then proceeds to a continuation terminal ("terminal A"). Digressing, a statement 616 of the file 600 declares the inclusion of the "x05.inc" file. See FIG. 6A.

From terminal A (FIG. 7B), the process 700 proceeds to a block 714 where the data shaper 402 reads the "73A.inc" include file, which contains a message handler for messages of type 73A (women's 500-meter finals). Digressing, a statement 618 of the file 600 declares the inclusion of the "73A.inc" file. See FIG. 6A. The "73A.inc" file is illustrated in greater detail with reference to a file 638 of FIG. 6C.

Returning to FIG. 7B, next, at decision block 716, the data shaper 402 verifies whether it has received a message of type 73A. If the answer at decision block 716 is NO, the process 700 loops back to form a waiting loop. The process 700 remains in the waiting loop until the data shaper 402 receives a message of type 73A. When the answer at decision block 716 is YES, the process 700 proceeds to a block 718 where the "exec.sp" process 552, executes a stored procedure "resultstore" using the database connection "olympics." Digressing, the "exec.sp" process 552 is defined between statements 642, 644 of file 638. See FIG. 6C.

Returning to FIG. 7B, performing the "get.attribute" process 586 to get two attributes from a root element of the message 73A, the data shaper 402 also creates two variables to reference these two attributes of the message 73A. See block 720. Digressing, the "get.attribute" process is defined between statements 646, 648 of file 638. See FIG. 6C.

Returning to FIG. 7B, next, the process 700 enters a block 722 where the "exec.sp" process 552 executes a stored procedure named "resultlist" to create publishable matter. This publishable matter may be formed using a customizable, tag-based language, such as XML. Next, the process 700 enters another continuation terminal ("terminal C"). Digressing, the "exec.sp" process 552 is defined between statements 650, 652 of file 638. See FIG. 6C.

From terminal C (FIG. 7C), the process 700 enters block 724 where the data shaper 402 executes the "save" process 570 to save the publishable matter to a predetermined directory path where the publishable matter can be found. Digressing, the "save" process 570 is defined between statements 654, 656 of file 638. See FIG. 6C.

Returning to FIG. 7C, next, the "send.message" process 562 sends a message to a publishing queue (not shown). See block 726. The "send.message" process 562 is defined between statements 658, 660 of the file 638. See FIG. 6C. Returning to FIG. 7C, the process 700 enters another continuation terminal ("terminal B"), which directs the process flow back to decision block 716 (FIG. 7B) and the process cycle described above is repeated.

Figure 8:
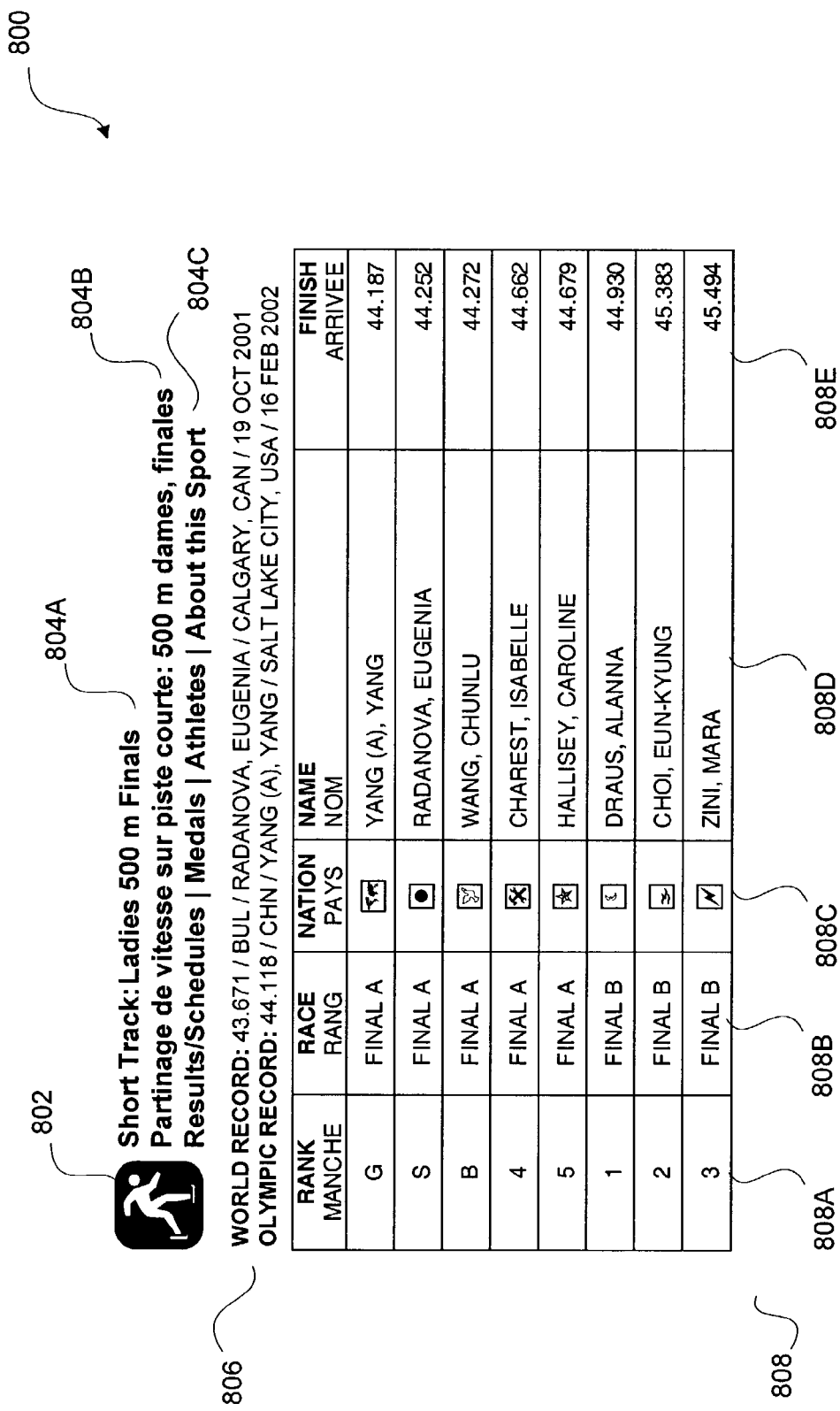
FIG. 8 is a pictorial diagram illustrating an exemplary Web page produced by the exemplary method illustrated by the process diagrams of FIGS. 7A–7C.

A Web page 800 shown in FIG. 8 illustrates the processing at the completion of block 726. The Web page 800 includes an icon, graphics, or symbol 802 identifying the sports event of interest. A heading 804a textually describes the sports event in the English language. Another heading 804b textually describes the event in another language, such as the French language. A number of hyperlinks 804c allow the user to activate and receive additional information associated with the event, such as results/schedules, medals, athletes, and detailed information about this particular sport. A matrix 808 provides the current status of the event. The matrix 808 includes multiple columns, 808A–808E: column 808A shows the ranking of athletes at the completion of the event; column 808B shows the heat participated in by the athletes; column 808C graphically shows the various nations competing in this event; column 808D textually displays the name of athlete participants; and column 808E shows the time record of each athlete that finished the competition.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system for processing messages for online presentation, the system comprising:
   a computer-readable storage medium having a description file stored thereon, the description file including multiple statements written in a customizable, tag-based interpreted language that uses procedural syntax for processing data contained in the messages; and a computer implemented data shaper for translating and executing the statements in the description file to produce publishing matter suitable for online presentation, the translation and execution of the statements defining the operational behavior of the data shaper, the operational behavior of the data shaper shaping the data contained in the messages to produce the publishing matter suitable for online presentation, wherein the messages contain instructions that modify the description file to modify the operational behavior of the data shaper.

2. The system of claim 1, further comprising a database coupled to the data shaper, the operational behavior of the data shaper including storing messages or publishable material in and retrieving messages or publishable material from the database.

3. The system of claim 1, further comprising a disk drive coupled to the data shaper, the operational behavior of the data shaper including controlling the saving and retrieving of messages or publishable matter to and from the disk drive, the operational behavior of the data shaper further including sending the publishable matter to a computing device external to the computer system.

4. The system of claim 1, further comprising a memory device coupled to the data shaper, the operational behavior of the data shaper including controlling the saving and retrieving of messages or publishable matter to and from the memory device, the operational behavior of the data shaper further including sending the publishable matter to a computing device external to the computer system.

5. A computer-implementable method for processing messages for online presentation, the method comprising:

reading a description file that includes multiple statements written in a customizable, tag-based interpreted language that uses procedural syntax for processing data contained in the messages; and translating and then executing, on a computing system, each statement of the multiple statements written in the customizable, tag-based interpreted language to produce publishable matter suitable for online presentation, the customizable, tag-based interpreted language defining the operational behavior of a data shaper that shapes the data contained in the messages to produce the publishable matter suitable for online presentation, wherein the messages contain instructions that modify the description file to modify the operational behavior of the data shaper.

6. The method of claim 5, further comprising storing messages or publishable matter on and retrieving messages or publishable matter from a database.

7. The method of claim 5, further comprising saving and retrieving messages or publishable matter to and from a disk drive or a memory device.

8. The method of claim 5, further comprising sending the publishable matter to a computing device external to the computer system implementing the method.

9. A computer-readable storage medium having computer-executable instructions for performing a method of processing messages for online presentation, the method comprising:

reading a description file that includes multiple statements written in a customizable, tag-based interpreted language that uses procedural syntax for processing data contained in the messages; and translating and then executing each statement of the multiple statements written in the customizable, tag-based interpreted language to produce publishable matter suitable for online presentation, the customizable, tag-based interpreted language defining the operational behavior of a data shaper that shapes the data contained in the messages to produce the publishable matter suitable for online presentation, wherein the messages contain instructions that modify the description file to modify the operational behavior of the data shaper.

10. The computer-readable storage medium of claim 9, further comprising storing messages or publishable matter on and retrieving messages or publishable matter from a database.

11. The computer-readable storage medium of claim 9, further comprising saving and retrieving messages or publishable matter to and from a disk drive or a memory device.

12. The computer-readable storage medium of claim 9, further comprising sending the publishable matter to a computing device external to the computer system implementing the method.

* * * * *